US011461392B2

(12) United States Patent
Soni et al.

(10) Patent No.: US 11,461,392 B2
(45) Date of Patent: *Oct. 4, 2022

(54) PROVIDING RELEVANT COVER FRAME IN RESPONSE TO A VIDEO SEARCH QUERY

(71) Applicant: Adobe Inc., San Jose, CA (US)

(72) Inventors: Sachin Soni, New Delhi (IN); Ashish Duggal, New Delhi (IN); Anmol Dhawan, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 16/791,673

(22) Filed: Feb. 14, 2020

(65) Prior Publication Data
US 2020/0183977 A1 Jun. 11, 2020

Related U.S. Application Data

(63) Continuation of application No. 15/274,679, filed on Sep. 23, 2016, now Pat. No. 10,606,887.

(51) Int. Cl.
G06F 16/00 (2019.01)
G06F 16/783 (2019.01)
G06F 16/73 (2019.01)
G06F 16/738 (2019.01)

(52) U.S. Cl.
CPC .......... G06F 16/7837 (2019.01); G06F 16/73 (2019.01); G06F 16/738 (2019.01)

(58) Field of Classification Search
None
See application file for complete search history.

(56) References Cited

U.S. PATENT DOCUMENTS 6,611,628 B1 8/2003 Sekiguchi et al.
6,909,745 B1 6/2005 Puri
8,239,359 B2* 8/2012 Barsook .............. G06F 16/7335
707/706
8,763,023 B1 6/2014 Goetz
8,959,071 B2 2/2015 Gunatilake
9,113,128 B1 8/2015 Aliverti et al.
(Continued)

OTHER PUBLICATIONS

Abbreviated Examination Report as received in GB1711692.2 dated Jan. 5, 2018.
(Continued)

Primary Examiner — Debbie M Le
(74) Attorney, Agent, or Firm — Keller Preece PLLC

(57) ABSTRACT

The present disclosure is directed towards methods and systems for providing relevant video scenes in response to a video search query. The systems and methods identify a plurality of key frames of a media object and detect one or more content features represented in the plurality of key frames. Based on the one or more detect content features, the systems and methods associate tags indicating the detected content features with the plurality of key frames of the media object. The systems and methods, in response to receiving a search query including search terms, compare the search terms with the tags of the selected key frames, identify a selected key frame that depicts at least one content feature related to the search terms, and provide a preview image of the media item depicting the at least one content feature.

20 Claims, 10 Drawing Sheets

(56) References Cited

U.S. PATENT DOCUMENTS

| | | | |
|---|---|---|---|
| 9,165,072 B1 | 10/2015 | Mayo et al. | |
| 9,805,269 B2 | 10/2017 | Shekhar et al. | |
| 10,299,017 B2* | 5/2019 | Borel | G06V 20/48 |
| 2016/0259494 A1 | 9/2016 | McMichael et al. | |
| 2017/0372755 A1 | 12/2017 | Merrill | |
| 2018/0089203 A1 | 3/2018 | Soni et al. | |

OTHER PUBLICATIONS

Examination Report as received in GB1611042.1 dated Dec. 6, 2018
U.S. Appl. No. 15/274,679, Apr. 19, 2019, Preinterview 1st Office Action.
U.S. Appl. No. 15/274,679, Aug. 9, 2019, Office Action.
U.S. Appl. No. 15/274,679, Nov. 27, 2019, Notice of Allowance.
Examination Report as received in Australian application 2017204338 dated Apr. 16, 2021.
Examination Report as received in United Kingdom Application GB1711692.2 dated Apr. 20, 2020.
Notice of Grant as received in Australian application 2017204338 dated Aug. 26, 2021.

\* cited by examiner

PROVIDING RELEVANT COVER FRAME IN RESPONSE TO A VIDEO SEARCH QUERY

CROSS-REFERENCE TO RELATED APPLICATIONS

The present application is a continuation of U.S. application Ser. No. 15/274,679, filed on Sep. 23, 2016. The aforementioned application is hereby incorporated by reference in its entirety.

BACKGROUND

Developments in communication technologies have resulted in significant advancements in media hosting technologies, and in particular, have led to the advent of users being able to freely upload content to, and search media content on, and download media content from, media-hosting systems. To illustrate, a user can use a search engine to search videos hosted by a media-hosting system. Based on the search query, many conventional media hosting systems search video titles or categories associated with a video to identify one or more search results. In response to processing the user's search, the media-hosting system can return a list of search results (e.g., a list of video titles) that the user potentially will find of interest (i.e., links of video titles pointing to identified videos). Accordingly, the user can select a result (e.g., select a link) to access a video.

Notwithstanding the advancements in media-hosting technology, conventional media-hosting systems suffer from a number of problems. One problem with many conventional media-hosting systems is that when a user searches for media objects (e.g., videos) related to particular content (e.g., subject matter within a video), conventional media-hosting systems often return search results in a form that are not indicative of the content within a particular result that may relate to the user's search. For instance, and as discussed above, returning a list of video titles often does not indicate much information about particular content within a video.

Furthermore, some conventional media-hosting systems, in response to a search, return an image representing an identified video, but the image is almost always irrelevant to the user's search related to particular content. For example, many conventional media-hosting systems assign a frame image from a video to represent the video. For example, some conventional media-hosing systems assign a first frame of a video (e.g., in the form of a thumbnail) to represent the content of the video, while other conventional media-hosting systems allow a user to manually select a frame of a video. As a result, the selected frame image rarely shows or indicates particular content features related to the search query initiated by the user.

Accordingly, conventional media-hosting systems often return search results that do not appear to be relevant to the user's search because the frame image does not allow a user to readily discern whether the video is related to the search query. In view of the foregoing, conventional media-hosting systems often cause users to pass over (e.g., not select, consider, or view) videos related to their search queries because the preview images do not appear relevant to the users' search queries. Consequently, most conventional media-hosting systems provide a search process that is inefficient and time consuming. For instance, due to the above described problems of conventional media-hosting systems, user's often have to spend significant amounts of time to perform multiple searches and view large portions of resultant videos in order to ultimately find a video having content the user seeks.

Accordingly, these and other disadvantages exist with respect to conventional media-hosting systems.

BRIEF SUMMARY

The various embodiments described below provide benefits and/or solve one or more of the foregoing or other problems in the art with systems and methods for identifying and providing relevant preview images of video content to a user in response to a search query. For example, the systems and methods disclosed herein identify potential preview images (e.g., video scenes, poster frames, etc.) for a media object (e.g., video) that include particular content features (e.g., the items depicted within a video frame). Based on a received search query, the system and methods select a particular preview image from the potential preview images that is most relevant to the search query. Moreover, the systems and methods provide the selected preview image to a user (i.e., to a user via a client device) such that the user can easily view an image of the most relevant portion of the media object as it relates to the search query.

In one or more embodiments, the systems and methods further determine a confidence value that indicates a probability that a particular key frame of video content includes a particular content feature (e.g., depiction of a dog). Based on determining confidence values for each identified content feature within each key frame, the systems and methods can identify which key frame is most likely to include the particular content feature. Accordingly, the systems and methods can rank, identify, or otherwise organize key frame(s) that correspond with the particular content feature based on the determined confidence values. As such, and based on the confidence values determined for the content features within the key frames, the systems and methods can select the key frames that are most relevant to a search query to use as a preview image of video content. For example, upon receiving a search query for "dog," the systems and methods can identify the particular key frame that depicts a dog, and provide an image of the key frame as a preview image in response to the search query.

Furthermore, and as briefly stated above, the systems and methods generate a set of potential preview images that may potentially be used as a preview image to represent a particular content feature found within video content. For instance, the set of potential preview images is based on images of the key frames (e.g., thumbnail images of the key frames). Moreover, the systems and methods generate and assign a tag to each potential preview image that indicates the content features depicted in each potential preview image. Based upon receiving a search query, the systems and methods can search tags of the potential preview images to determine the media object relates to the search query, and in addition, can search the tags to identify from the set of potential preview images, a preview image that most closely aligns with the search query. Therefore, because the systems and methods provide as a preview images the relevant portion(s) of a media object as related to a search request, a user can easily and efficiently identify video content that interests the user without the user having to manually view videos to locate relevant content.

Additional features and advantages of the embodiments will be set forth in the description that follows, and in part will be obvious from the description, or may be learned by the practice of such example embodiments. The features and advantages of such embodiments may be realized and obtained by means of the instruments and combinations particularly pointed out in the appended claims. These, and other features, will become more fully apparent from the following description and appended claims, or may be learned by the practice of such example embodiments as set forth hereinafter.

BRIEF DESCRIPTION OF THE DRAWINGS

Various embodiments will be described and explained with additional specificity and detail through the use of the accompanying drawings in which.

DETAILED DESCRIPTION

Figure 1:
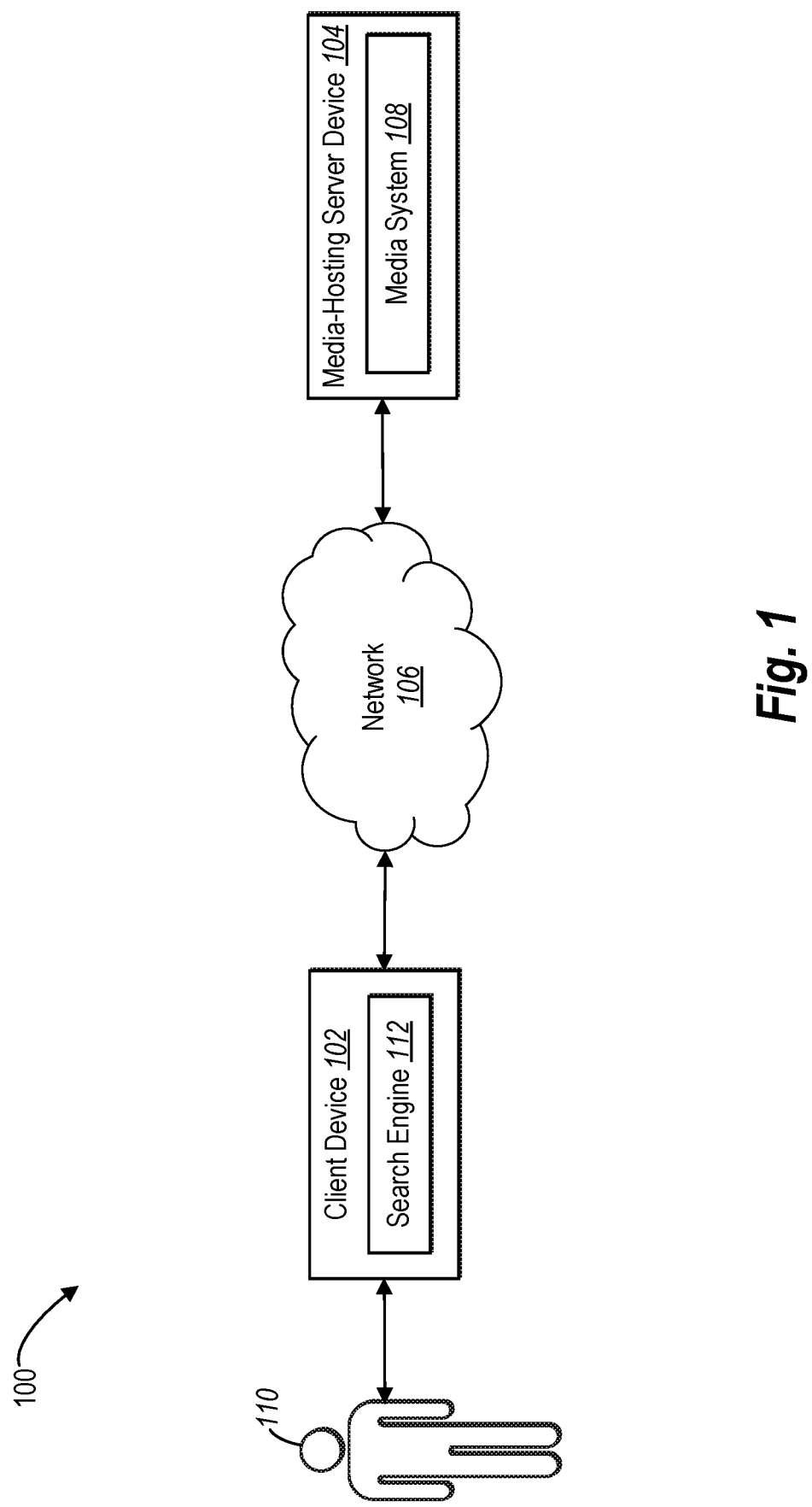
FIG. 1 illustrates a schematic diagram of a communication system in accordance with one or more embodiments.

The embodiments described below provide a media system for identifying and providing preview images (e.g., poster frames) for a media object (e.g., video content) that are relevant to a search query received from a user of the media system. In one or more embodiments, the media system identifies content features (e.g., objects, activities, emotions, animal, sceneries, locations, colors) depicted in a group of key frames from the video content. Additionally, and based on the identified content features, the media system selects one or more key frames to generate a set of potential preview images (e.g., potential poster frames) that may be used to represent the video content as a search result in response to a search query. Moreover, in one or more embodiments, upon receiving a search query, the media system identifies a particular video that relates to the search query, and in addition, the media system selects a preview image from the set of potential preview images for the particular video that most closely aligns with the search query.

Accordingly, in response to a search query for video content, the media system identifies and provides search query specific preview images for video content that indicate specific content features that are related to the search query. For example, a particular digital video may have two portions of video that include two different content features. The media system may determine that a first content feature is related to a first search query, and accordingly, provide a first preview image taken from a key frame of the first portion of video in response to the first search query. Furthermore, the media system may determine that a second content feature is related to a second search query, and thus, provide a second preview image taken from a key frame of the second portion of video. In other words, the media system can provide different and customized preview images for a single instance of video content to provide a preview image that relates to a given search query.

In one or more embodiments, and as stated briefly above, the media system generates a set of potential preview images (e.g., thumbnails) based on selected key frames from a video content, and associates each potential preview image with a tag that indicates a content feature(s) identified in each selected key frame. Accordingly, based upon receiving a search query, the media system uses the tags associated with each media object (e.g., associated with the potential preview images of a media object) to identify media objects, and additionally, to identify key frames and/or preview images for media objects that are relevant to the search query.

As noted above, the media system identifies key frames of video content within a media object. For example, the media system can utilize content-based and non-content based methods to identify the key frames of video content (e.g., scene detection analysis). In addition, and as also mentioned above, upon identifying the key frames, the media system employs content feature recognition technology to identify content features within the key frames. For example, in one or more embodiments the media system uses machine learning techniques to train a neural network model that can accurately identify content features depicted within each key frame.

Furthermore, upon detecting the content features of each identified key frame, the media system can determine confidence values for each of the detected content features in a key frame. In one or more embodiments, and using the confidence values, the media system filters or discards one or more key frames to create a set of key frames that are most likely to actually include any identified content features. Specifically, the media system can select key frames based on the confidence values assigned to the content features of the identified key frames. In other words, the media system can select key frames having the highest confidence values in regard to content features to use as potential preview images.

In one or more embodiments, and based on determined confidence values, the media system selects a single key frame to be included as a potential preview image of the media object for each detected content feature of the media object. In other words, in the event that a particular content feature is identified in two key frames, the media system selects the key frame having the highest confidence value to represent the media object for the particular content feature. In other embodiments, the media system can generate multiple preview images that relate to a single search query so long as the confidence values associated with the respective key frames is above a defined confidence value threshold. For instance, based on receiving a query, the media system may select two preview images to represent a single media object (e.g., the system can provide the two preview images as two separate results, or alternatively, can provide a single result that includes the two preview images combined, as further described below).

Accordingly, and as will be explained in further detail below, in one or more embodiments, the media system receives a search query, and in response to the search query, can query tags associated with media objects to identify key frames and/or preview images of media objects that are relevant to the search query. For example, the media system can compare search terms of the search query to the tags assigned to a media object to identify a preview image(s) that is relevant to search terms of the query. Upon selecting a relevant preview image of a media object, the media system can provide the preview image of the media object within a set of results that the system provides for display to a client device of a user.

Accordingly, the various embodiments of the media system described herein provide advantages over conventional media-hosting systems. For example, and unlike conventional media-hosting systems, the media system can provide a preview image for a video content search result based on video scenes within the video content that are relevant to a search query. In particular, instead of merely providing the first frame of a video (e.g., per conventional methods), the media system can provide a preview image representing a media object that depicts content features that are specifically related to a search query. Furthermore, and unlike conventional media-hosting systems, the media system can provide multiple preview images for a single media object that include content features related to a search query to indicate various examples of content features within a media object that relate to a search query.

Accordingly, based on the media system providing a custom selected preview image based on a specific search query, a user can readily discern whether a media object is of interest to the user without having to manually view an entire video to try and locate relevant content within a video search result. This provides significant advantages over conventional media systems, which often provide a random, and thus, irrelevant frame sample. Therefore, as a result of the media system providing relevant preview images of video content in response to search queries, users have a more enjoyable, more efficient, and less frustrating experience in comparison to conventional media systems. In particular, receiving relevant preview images in response to search queries can save users time and effort in finding content in which the user is interested.

The various embodiments of the media system also provide advantages to authors of media objects. For example, the media system of the present disclosure removes any need for the author to manually select a frame of the author's media object to represent the media object, which saves the author time and effort. Furthermore, an author can be assured that, when a user provides a search related to content features included in the author's media object, the media system will provide a relevant preview image that depicts the content features within the media object in which the user may have the greatest interest. As a result, users may be more likely to download and purchase the author's media object.

Furthermore, the media system described herein provides improvements in the performance of a computer system. For example, because the media system provides relevant preview images of the media objects, the media system can lead to faster processing of search queries. Furthermore, because media system provides relevant preview images in response to search queries, the media system can optimize the number of searches received from users because users can more readily determine if their searches are yielding media objects relevant to the users' interests. Moreover, the media system results in fewer downloads of video content that a user ultimately deems irrelevant to the user's interest, thus resulting in less data transfer and fewer data bandwidth usage for the computer system. In other words, the media system results in less required processing power and communication bandwidth in comparison to conventional media-hosting systems. Moreover, because the preview images can be generated prior to search queries (e.g., in anticipation of search queries), the media system of the present disclosure can result in faster processing of search queries in comparison to conventional media systems.

As used herein, the term "media object" refers to digital media data that includes at least some video content. For example, a media object can include a digital video. Additionally, a media object can include a digital video as well as other types of digital media (e.g., digital photos, digital audio, slideshow presentation, text, and/or any other type of digital media data).

In addition, as used herein, the terms "digital video," "video content," or simply "video" refers to encoded digital data comprising a representation of one or more visual images. For example, video content can include one or more frames (e.g., digital images) that are As often is the case, video content also includes audio data that accompanies the visual images.

As used herein, the term "content feature" refers to a digital element is included and/or depicted in one or more frames of a video content. For example, a digital element can include, but is not limited to, an object (e.g., bike, car, tree), a person, an activity (e.g., running, skydiving, hiking), an image type (e.g., macro, portrait, panorama), an emotion (e.g., smiling, crying), an animal (e.g., dog, cat), scenery (e.g., beach, forest, mountains), a geographic location, a structure (e.g., house, bridge), a color, and/or any other item or element depicted within video content.

FIG. 1 illustrates a schematic diagram of an example communication system 100 in which a media system operates in accordance with one or more embodiments. As illustrated, the communication system 100 includes a client device 102, a media-hosting server device 104, and a network 106. The client device 102 and the media-hosting server device 104 can communicate via the network 106. The network 106 can include one or more networks, such as the Internet, and can use one or more communications platforms or technologies suitable for transmitting data and/or communication signals. Although FIG. 1 illustrates a particular arrangement of the client device 102, the media-hosting server device 104, and the network 106, various additional arrangements are possible. For example, the media-hosting server device 104, can directly communicate with the client device 102, bypassing the network 106.

As illustrated in FIG. 1, a user 110 can interface with the client device 102, for example, to access media objects stored on the media-hosting server device 104. The user 110 can be an individual (i.e., human user), a business, a group, or any other entity. In addition, the user 110 can be an author of media objects that uploads media objects to the media-hosting server device 104 via the client device 102. In addition, or alternatively, the user 110 can be a consumer of media objects that searches and downloads media objects for various purposes. Although FIG. 1 illustrates only one user 110 associated with the client device 102, the communication system 100 can include any number of a plurality of users that each interact with the communication system 100 using a corresponding client device.

In addition, and as shown in FIG. 1, the client device 102 can include a search engine 112. Specifically, the client device 102 can include a search engine 112 for providing search queries to the media-hosting server device 104 to locate media objects stored on the media-hosting server device 104 that are of interest to the user 110. In additional embodiments, the search engine 112 can be located on a third party device (e.g., a separate server) that is accessed by the client device 102 via the network 106. Regardless, in response to a search query, the media-hosting server device 104 can communicate media object search results (e.g., video content relating to a search query) to the client device 102. In particular, the media-hosting server device 104 can provide, to the client device 102 via the network 106, a search results list that comprises links to media objects related to a search query.

Both the client device 102 and the media-hosting server device 104 can represent various types of computing devices with which users and media hosting administrators can interact. For example, the client device 102 and/or the media-hosting server device 104 can be a mobile device (e.g., a cell phone, a smartphone, a PDA, a tablet, a laptop, a watch, a wearable device, etc.). In some embodiments, however, the client device 102 and/or media-hosting server device 104 can be a non-mobile device (e.g., a desktop or server). Additional details with respect to the client device 102 and the media-hosting server device 104 are discussed below with respect to FIG. 8.

As shown in FIG. 1, the media-hosting server device 104 includes a media system 108. As described in further detail below with regard to FIGS. 2A-5, the media system 108, in combination with the media-hosting server device 104, identifies content features depicted within frames of video content, and as a result, can generate a preview image to represent the video content as a search result. In particular, the preview image is generated and provided to include a content feature corresponding to a search query (e.g., the media system generates and provides a preview image from a video frame within video content that includes a dog in response to receiving a search query including the term "dog").

Figure 2A:
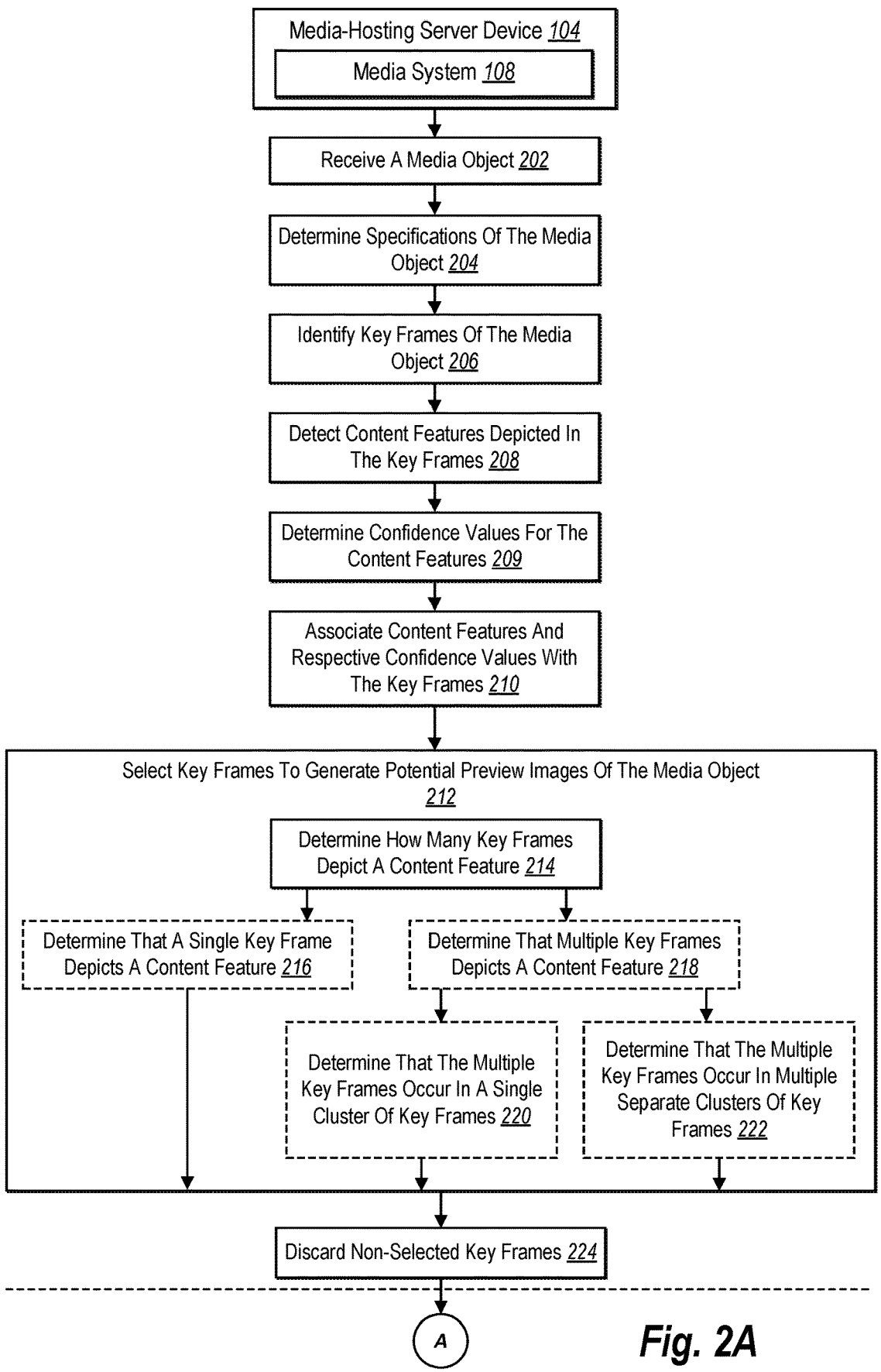
FIGS. 2A-2C illustrate a sequence-flow diagram of analyzing a media object to identify and provide a relevant preview image of the media object in response to a search query in accordance with one or more embodiments.
Figure 2B:
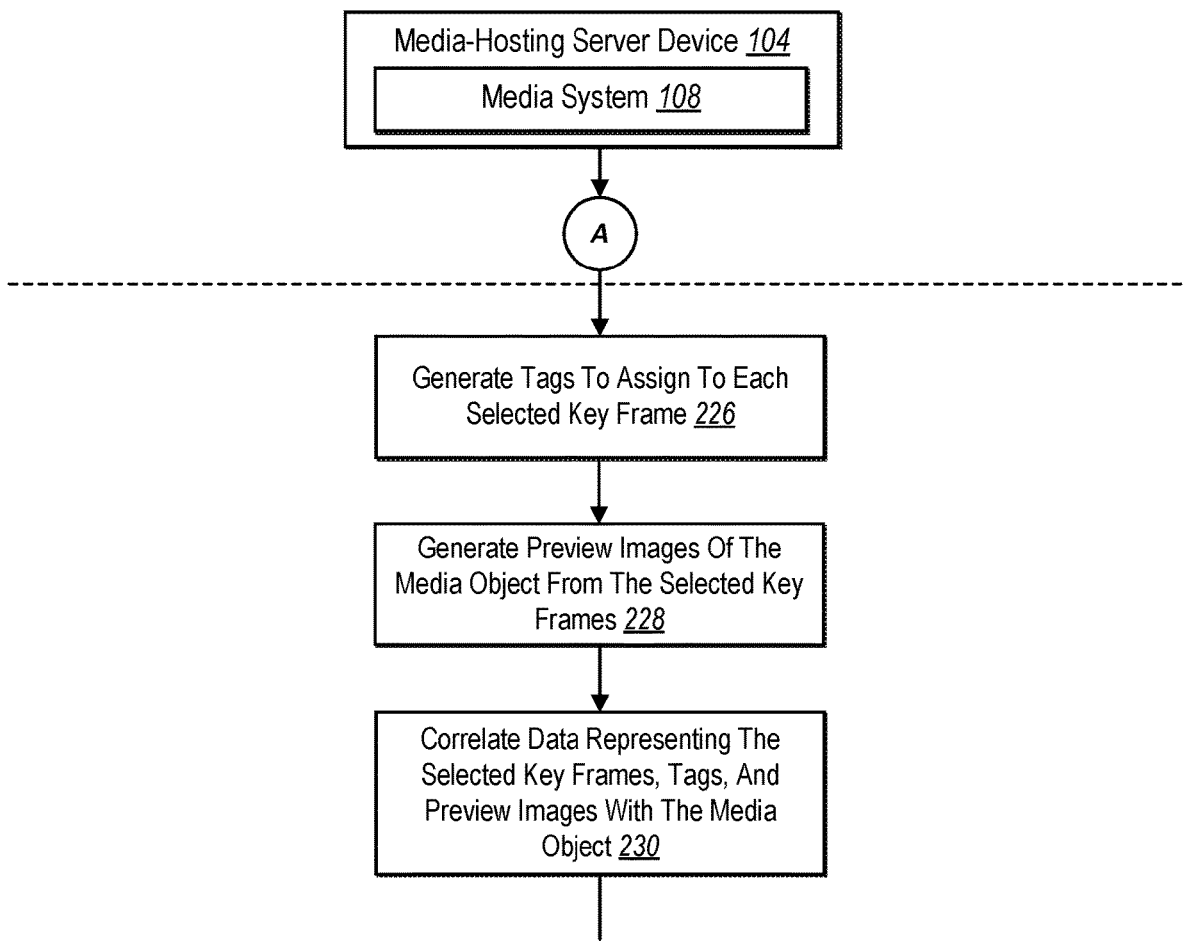
Figure 2C:
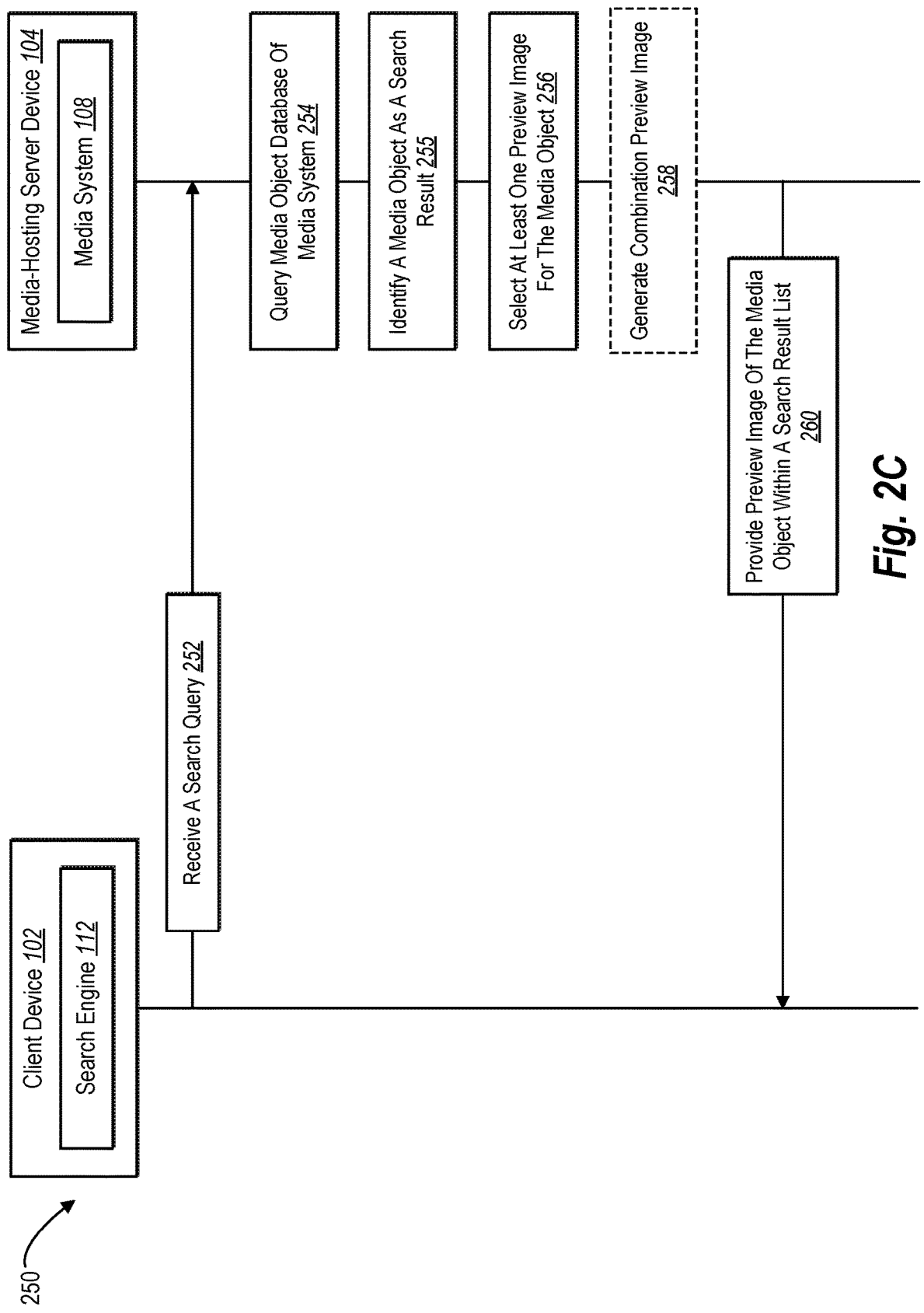

FIGS. 2A-2C illustrate example embodiments of the media system 108 via various sequence-flow diagrams. For instance, FIGS. 2A-2C illustrate one or more embodiments of a sequence-flow the media system 108 uses to identify content features included in a media object, generate potential preview images for a media object based on the identified content features, and select a preview image having content features that relate to a search query. In particular, the media-hosting server device 104 shown in FIGS. 2A-2C may be an example embodiment of the media-hosting server device 104 described with regard to FIG. 1, and the client device 102 shown in FIG. 2C may be an example embodiment of the client device 102 described with regard to FIG. 1.

As shown in FIG. 2A, the media-hosting server device 104 can receive a media object (e.g., from a client device), as shown in step 202. Specifically, the media-hosting server device 104 can receive and store a media object in a media object database. In some embodiments, a client device (e.g., client device 102) provides a media object to the media-hosting server device 104. For example, the client device 102 can upload a media object to the media-hosting server device 104 via the network 106. Put another way, the user 110 of the client device 102 can interact with the client device 102 to cause the client device 102 to provide the media object to the media-hosting server device 104. Alternatively, in one or more embodiments, the media object is already stored on the media-hosting server device 104. In other words, the media object may already be present on the media-hosting server device 104, and accordingly, the step 202 of receiving a media object may not occur in every embodiment.

In response to receiving a media object, in one or more embodiments the media system 108 determines one or more specifications of video content included in the media object, as shown in step 204 of FIG. 2A. For example, the media system 108 detects one or more of the type of the video content (e.g., .mp4, .avi, .mkv, .mov, .flv, etc.), a frame rate of the video content, a total number of frames of the video content, and/or video quality (e.g., resolution) of the video content. Depending on a particular embodiment, the media system 108 determines other specifications of the video content.

In addition, the media system 108 can use the one or more specifications of the video content in a process to identify key frames of the video content within the media object, as show in step 206 of FIG. 2A. As used herein, the term "key frame" and any derivative terms refer to a frame of video content of a media object that is representative of a portion (e.g., a plurality of sequential frames) of the video content. For instance, a portion of video content can relate to a scene within the video content and can include a defined number of frames that relatively depict the same content features. Thus, a key frame would be a single frame that includes content features that represents the portion of video that includes the scene. Accordingly, a collection of key frames of video content can provide a compact summary of the video content of a media object (e.g., the content features) in comparison to using all of the frames within the video content.

The media system 108 can identify key frames of the video content using any of a variety of methods. For example, the media system 108 can utilize non-content-based methods, content-based methods, or combinations thereof, to determine (e.g., identify) the key frames of the video content. Each of the foregoing will be described in detail below.

As noted above, the media system 108 can use non-content-based methods for identifying key frames of video content. For example, when utilizing non-content based methods to identify key frames of video content, the media system 108 can use spatial segmentation of each frame of the plurality of frames of the video content to detect defined portions (e.g., clusters of frames) of the video content. The defined portions of video content can be detected based on changes in imagery from one frame to a next sequential frame or from one cluster of frames (e.g., sequence of consecutive frames) to a next cluster of frames. Based on detecting defined portions of video content, the media system 108 can identify one or more frames within each defined portion of video content to be key frames (e.g., a frame to represent a defined portion of video content).

In addition, in one or more embodiments, the media system 108 can identify key frames (e.g., select key frames) at predefined intervals of the video content. For instance, the media system 108 can identify a frame of the video content to be a key frame for every given time interval (e.g., 3 seconds) of the video content. In additional embodiments, the media system 108 can select a frame of the video content to be a key frame for every given number of frames (e.g., every 30 frames) of the video content. In other words, for every given number of consecutive frames of the video content, the media system 108 selects one of the frames to be a key frame.

In addition to non-content-based methods, and as mentioned briefly above, one or more embodiments of the media system 108 can use content-based methods to identify key frames of video content. For example, the media system 108 can determine content features (e.g., objects, activities, colors, etc.) included (e.g., depicted) in the frames of the video content using machine learning. Furthermore, based on the content features of the frames, the media system 108 can group frames of the media object into homogeneous clusters (e.g., clusters of frames sharing at least substantially the same content features). Accordingly, the media system 108 can select at least one key frame from each homogeneous cluster of frames as a key frame.

The media content system 108 can determine frames to include in a particular cluster of frames based on one or more characteristics of each frame. For instance, the media system 108 can determine to cluster one or more frames based on whether the frames share one or more content features (e.g., items depicted within each frame). Additionally, the media system 108 can identify key frames of the media object by comparing non-adjacent frames, using inter-frames entropy, histograms similarity, or wavelets, selecting frames having maximum ratios of objects to background (when compared to other frames of the video content), and/or any combinations thereof.

In addition, in one or more embodiments, the media system 108 can perform a key frame analysis on only a subset of frames (e.g., as opposed to all of the frames) within the video content. For instance, depending on the one or more specifications of the video content within a media object, the media system 108 can determine to perform a key frame analysis on every fourth frame. For example, the media system 108 can perform a key frame analysis on a higher percentage of video frames based on determining video content has a low frame rate, while on the other hand, the media system 108 can perform a key frame analysis on a lower percentage of video frames based on determining video content has a high frame rate.

Based on identifying key frames of the media object, the media system 108 generates and stores a data package including a compilation (e.g., collection) of the key frames associated with a media object within the media object database of the media-hosting server device 104. For example, the media system 108 can assign a key frame identification number ("key frame ID No.") (e.g., 1, 2, 3, 4, 5, etc.) to each key frame of the media object within the media object database (e.g., within a table stored in the media object database) of the media-hosting server device 104. Furthermore, the media system 108 can store data representing a sequence (e.g., a list) of the key frames of the media object by the respective key frame ID numbers within the media object database. Moreover, the media system 108 stores data representing a timestamp (e.g., a timestamp indicating a position of the key frame relative to the other frames of the video content) within the media object database. Likewise, the media system 108 correlates the timestamps to the respective key frame. The media object database is discussed in greater detail below in regard to FIGS. 3-5.

In addition to identifying key frames of video content for a particular media object, FIG. 2A illustrates that the media system 108 detects content features included and/or depicted in the key frames, as shown in step 208 of FIG. 2A. In some embodiments, the media system 108 can detect content features of the key frames while (e.g., in conjunction with) identifying the key frames of the media object. Alternatively, the media system 108 can detect content features depicted in the key frames after the media system 108 identifies key frames of the media object. Specifically, the media system 108 detects objects, activities (e.g., running, skydiving, hiking), photo types (e.g., macro, portrait, etc.), emotions (e.g., smiling, crying, etc.), animals, sceneries (e.g., beach, forest, mountains), locations, colors, etc. depicted in the key frames of video content within a media object.

In one or more embodiments, the media system 108 detects content features of the key frames by analyzing the key frames with content feature recognition technology (e.g., object recognition technology) of the media system 108. For example, the content feature recognition technology can recognize (e.g., detect) the content features depicted in the key frames using machine learning (e.g., deep learning). More specifically, the content feature recognition technology can use machine-learning algorithms to detect and identify content features represented in the key frames of the media object.

Depending on a particular embodiment, for example, media system 108 can use a variety of machine-learning techniques to detect content features within key frames. For example, the media system 108 can analyze a key frame using a neural network to detect a content feature within the key frame. In particular, in one or more embodiments, the media system 108 is a region-based convolutional neural network (i.e., a RCNN) or a fast region-based convolutional neural network (i.e., a F-RCNN). The media system 108 can use other forms of content feature detection, depending on a particular embodiment. Although the media system 108 is specifically described herein as using machine-learning for detecting content features depicted within key frames, the media system 108 can use any content feature recognition technology that is able to detect and identify a content feature within a frame of video.

Additionally, beyond detecting and identifying content features within a key frame of video content within a media object, the media system 108 can determine characteristics of the content features. For example, the media system 108 can determine a percentage of space of a key frame that is occupied by a content feature or content features (e.g., a ratio of content features vs. background). Furthermore, the media system 108 can determine an orientation associated with a particular content feature. For instance, and in the case of a content feature including a person, the media system 108 can determine whether the person is oriented as front facing, side facing, back facing, etc. Moreover, the media system 108 can determine the content feature's relative position within a key frames. For example, the media system 108 can determine if the content feature is centered within the key frame.

In addition to, and based on, detecting and identifying characteristics of a content feature within a key frame, the media system 108 can identify a name, a type, or a category for a content feature depicted within a key frame. For example, the media system 108, based on a trained machine-learning model, can identify that a content feature detected within a key frame is Babe Ruth (e.g., the name), a person (e.g., type), and/or a man (e.g., category). In addition, in one or more embodiments, the media system 108 can further associate characteristics with the identified content feature. For example, the media system 108 can associate orientation, position within a frame, and/or other characteristics with the identified content feature. For instance, [Babe Ruth, front facing, centered], [person, front facing, centered], and/or [man, front facing, centered] to indicate the name, type, and/or category in combination with one or more characteristics of the content item. As will be discussed in further detail below with reference to step 210, the media system 108 associate identification and characteristic data for a content feature with a key frame that includes the content feature.

In addition to identifying content features within key frames of video content, the media system 108 can also determine confidence values for each identified content feature, as illustrated in step 209 of FIG. 2A. As used herein, a "confidence value" represents a probability that a media system identified content feature within a key frame is actually the content feature. For example, the media system 108 can assign a percentage value of how confident the media system 108 is that a particular content feature is included and/or depicted in a key frame. In addition, various factors can affect confidence values, such as, image quality, the portion of a content feature included within a key frame (e.g., half of a person's head vs. the entirety of a person's head), the contrast between a content feature and the background, the similarity of characteristics of a content feature with another different content feature (e.g., a toy car vs. an actual car), and/or other factors.

In one or more embodiments, the machine-learning models described above provide the confidence values as an output. For instance, based on a trained convolution neural network model, the model can predict a confidence value for a particular content feature based on how well the content feature aligns with one or more training examples of a trained content feature. For example, a convolution neural network model can be trained to recognize a dog using a large training set of dog images. Accordingly, the convolution neural network model can, in essence, compare characteristics of a content feature identified within a key frame to characteristics of one or more of the dog images in the training set to calculate a probability that the identified dog in the key frame is actually a dog.

In some embodiments, if the confidence value associated with a particular content feature in a key frame is below a defined threshold confidence value (e.g., below 30%), the media system 108 can elect to not identify the content feature. In other words, the media system 108 determines, based on the confidence value being below the threshold, that the probability of the content feature being accurate is not sufficient to be used in a preview image to represent the particular content feature. The media system 108 can define a threshold confidence value at or below any probability value, for example, at or below 10%, 20%, 30%, 40%, etc.

In addition to identifying key frames, identifying the content features depicted in the key frames, and determining confidence values associated with the detected content features, the media system 108 associates the detected content features and their respective confidence values with the identified key frames, as shown in step 210 of FIG. 2A. Specifically, the media system 108 generates and stores data that corresponds to identified content features within each respective key frame, and their associated confidence values, within a media object database of the media system 108. Step 210 of FIG. 2A is explained in additional detail with respect to FIG. 3.

Figure 3:
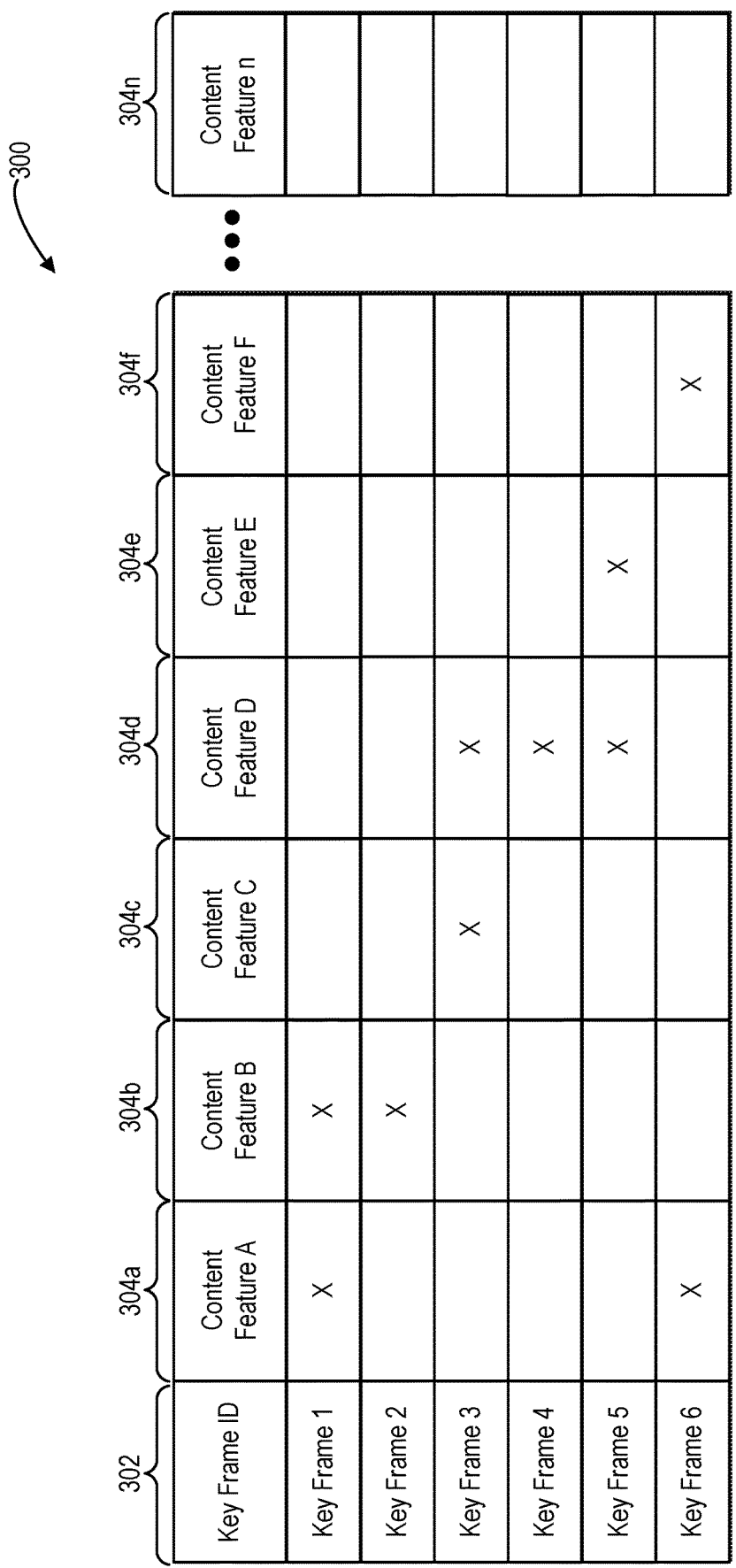
FIG. 3 illustrates an example data table of a media object database in accordance with one or more embodiments.

In particular, FIG. 3 illustrates an example data table 300 used to associate the identified content features and corresponding confidence values with each respective key frame. Specifically, the data table 300 can include a key frame column 302, which includes a plurality of identified key frames indicated by key frame ID numbers (e.g., key frame 1, key frame 2, key frame 3, etc.). For instance, the key frames listed in the key frame column 302 include the key frames identified by the media system 108 of the media-hosting server device 104. Specifically, the media system 108 can populate the key frame column 302 with key frame ID numbers in response to the media system 108 identifying the key frames, as discussed above in regard to step 206.

In addition, the data table 300 can include a plurality of content feature columns 304 (e.g., 304a, 304b, 304c, etc.) each identified by a content feature IDs (e.g., content feature A, content feature B, content feature C, etc.), as illustrated in FIG. 3. Each content feature column 304 of the plurality of content feature columns 304 represents a respective content feature identified by the media system 108, as described above. In other words, each detected content feature has its own respective content feature column 304. As a non-limiting example, the media system 108 can generate the data table 300 based on the media system identifying content features within key frames, as described above in regard to step 208 of FIG. 2A. Furthermore, the media system 108 can generate the plurality of content feature columns 304 based on the detected content features within video content of a media object.

Moreover, each detected content feature is associated with at least one key frame in the key frame column 302 by an indicator (e.g., marker, check mark, X, or any other marker). The media system 108 can associate the content features of the plurality of content features columns with a key frame by generating an indicator in a row of the content feature column 304 associated with the key frame 302 in which the content feature was identified, as illustrated in FIG. 3. In other words, each content feature can be associated with a key frame by having an indicator in a row of the data table 300. Although the media system 108 of the present disclosure is described as associating the detected content features with the identified key frames with a data table within a database, the disclosure is not so limited, and the media system 108 can utilize any method known in the art for associating data.

Referring back to FIG. 2A, in addition to associating detected content features with determined key frames, in one or more embodiments the media system 108 selects (e.g., designates) at least one key frame of the identified key frames to generate a potential preview image (e.g., poster frame) of the media object, as shown in step 212 of FIG. 2A. Specifically, as is discussed in greater detail below in regard to FIG. 2B, the media system 108 selects key frames to generate potential preview images of the media object that correspond to identified content features of the video content within the media object that relate to a search query. In other words, the media-hosting server device 104 provides, in response to a search query, a preview image selected from one or more potential preview images of a media object based on the preview image depicting a content feature that relates to the search query.

Figure 4:
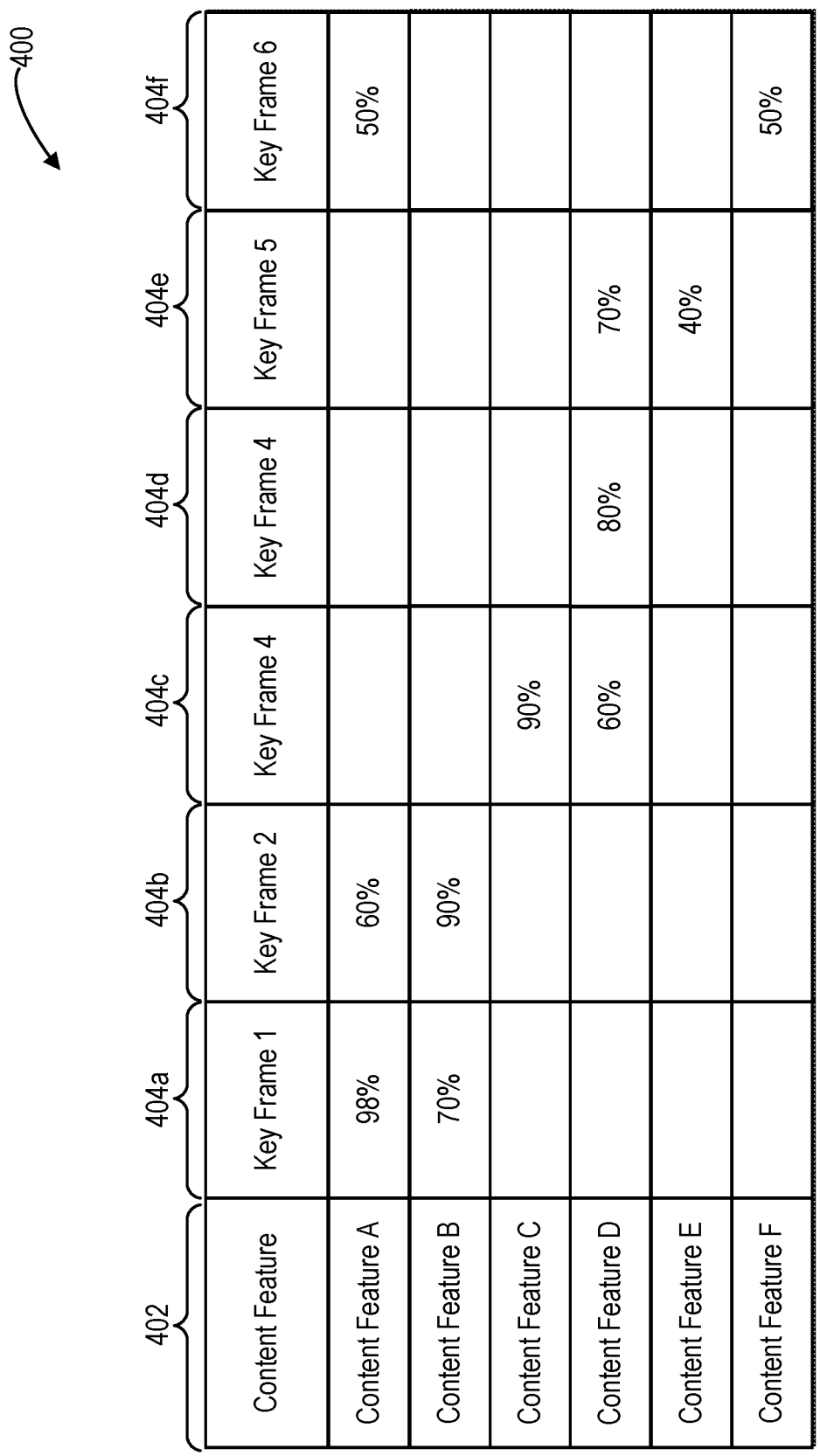
FIG. 4 illustrates another example data table of a media object database in accordance with one or more embodiments.

In some embodiments, the media system 108 selects the key frames of the identified key frames to include as preview images of the media object by using data concerning the key frames (e.g., confidence values, timestamps, and identified content features of the key frames) from the media object database of the media-hosting server device 104. For example, the media system can use the data table 300 described above to select the key frames for generating potential preview images. In addition, FIG. 4 illustrates an example data table 400 within the media system database. The media system 108 can use the data table 400 to select at least one key frame of the identified key frames to generate a potential preview image of the media object.

Similar to the discussion above with reference to data table 300, the data table 400 can include a content feature column 402. Specifically, the content feature column 402 can include a plurality of content features of the media object identified by the content features IDs (e.g., A, B, C, D, etc.). For example, the plurality of content features listed in the content feature column 402 of the data table 400 include the detected content features of the key frames discussed above.

In addition, the data table 400 includes a plurality of key frame columns 404 (e.g., 404a, 404b, 404c, etc.), and each key frame column 404 of the plurality of key frame columns 404 represents an identified key frame. Each key frame column 404 can indicate that the respective key frame depicts one or more content features of the plurality of content features listed in the content feature column 402. For example, and as shown in FIG. 4, in some the data table 400 can indicate that a particular key frame includes a content feature by including a confidence value in the key frame column 404 of a particular key frame corresponding with a particular content feature 402. If a key frame was not detected as including a content feature, the key frame column 402 of the key frame includes an indicator or empty space indicating that the content feature was not detected in the key frame (or that a content feature did not have a confidence value above a defined confidence value threshold).

As a non-limiting example, the data table 400 can indicate that a first key frame 404a includes content feature A with a 98% confidence value and content feature B with a 70% confidence value, as illustrated in FIG. 4A. In addition, a second key frame 404b includes content feature A with a 60% confidence value and content feature B with a 90% confidence value, as also illustrated in FIG. 4A.

Referring back to FIG. 2A and step 212, the media system 108 can perform various additional steps in selecting key frames to generate a potential preview image of the media object for each content feature detected in the media object. Particularly, for each detected content feature of the media object, the media system 108 determines how many key frames depict a particular content feature, as shown in step 214 of FIG. 2A. For example, the media system 108 queries the data table 400 (or data table 300) to determine how many key frames include the particular content feature. For instance, depending on the content feature, the media system 108 can determine that only one key frame is associated with a content feature (e.g., Key Frame 6 is the only key frame associated with Content Feature F in data table 400), while several key frames may be associated with another content feature (e.g., Key Frame 1 and Key Frame 2 are both associated with Content Feature A and Content Feature B in data table 400).

If, on one hand, the media system 108 determines that a single key frame includes a particular content feature, as shown in step 216 of FIG. 2A, the media system 108 selects the single key frame to use as a preview image of the media object for that particular content feature. In other words, as is described in more detail below in regard to FIG. 2B, the media system 108 determines that the selected key frame will be used to generate a preview image for the media object in response to a search query related to the particular content feature depicted within the single key frame.

On the other hand, if the media system 108 determines that multiple key frames include the content feature, as shown in step 218 of FIG. 2A, the media system 108 can perform one or more additional steps to select key frames to generate potential preview images. For example, in one or more embodiments the media system 108 determines whether the multiple frames occur in one or more clusters (e.g., groups) of key frames of the media object, as shown in steps 220 and 222 of FIG. 2A. In other words, the media system 108 determines whether the multiple key frames including associated with a particular content feature occur in a single sequential cluster of key frames (e.g., key frames 2, 3, and 4) or whether the multiple key frames occur in separate (e.g., not sequential) clusters of key frames (e.g., key frames 2 and 3 and key frame 7 and 8). For example, the media system 108 queries the data table 400 to determine whether multiple clusters of key frames (e.g., separate clusters) of key frames key include the content feature or whether a single cluster of key frames includes the content feature.

If the media system 108 determines that the multiple key frames occur in a single cluster of key frames of the media object, as show in step 220 of FIG. 2A, the media system 108 can select one key frame from the cluster to use in generating a potential preview image. For instance, because the multiple key frames occur in a single cluster, the media system can determine that the content feature within each of the multiple key frames is substantially the same content feature. To select the one key frame from the cluster, the media system 108 can compare the confidence values of each key frame of single cluster of key frames and can select the key frame of the single cluster of key frames having the highest confidence value in regard to the detected content feature. For example, the media system 108 can compare the confidence values of the key frames of the single cluster of key frames included in the data table 400.

In alternative embodiments, the media system 108 does not compare confidence values of the key frames of the single cluster of key frames. Rather, the media system 108 can select a key frame of the single cluster of key frames to generate a potential preview image of the media object randomly. For example, the media system 108 can include a random number generator and can select a key frame of the single cluster of key frames randomly using the random number generator.

In other embodiments, the media system 108 can conduct an additional analysis on the multiple key frames to determine the likelihood that the multiple key frames do or do not reflect the same content feature instance (e.g., the same dog vs. two different dogs). Based on the additional analysis, the media system can select one key frame if it is determined that the multiple key frames likely depict the same content feature instance (e.g., the same dog). Alternatively, based on the additional analysis, the media system can select two or more key frames from the multiple key frames if it is determined that the multiple key frames depict different content instances (e.g., two different dogs). For example, a key frame associated with each content instance can be selected to generate a potential preview image.

In some instances, two or more key frames of the single cluster of the key frames can have the same confidence value with respect to a particular content feature. In such instances, the media system 108 can select a first key frame of the two or more key frames having the same confidence value (e.g., a first key frame when the two or more key frames are considered sequentially based on timestamp information). In other words, the media system 108 selects the key frame that is ordered first of the two or more key frames in a time dependent sequence.

Alternatively, and based on the instance described in the preceding paragraph, the media system 108 can compare a percentage of space of the key frame that is occupied by the content feature or content features. In such embodiments, a key frame having a higher ratio of a content feature versus background can be given preference, and the media system 108 can select the key frame having the higher ratio. In yet additional embodiments, other characteristics of the content features can be considered in selecting the key frame. For example, the media system 108 can determine whether the content feature is front facing, side facing, of back facing, and content features having a particular orientation can be given preference. Alternatively, the media system 108 selects a key frame of the two or more key frames having the same confidence value to include in a preview image of the media object randomly. As noted above, the media system 108 can include a random number generator, and the media system 108 can use the random number generator in selecting a key frame of the two or more key frames having the same confidence value.

As mentioned briefly above, in some embodiments, the media system 108 determines that the multiple key frames including the content feature occur in multiple separate (e.g., not connected) clusters of key frames of the media object, as shown in step 222 of FIG. 2A. In such an instance, the media system 108 can determine a key frame from each cluster of key frames based on the assumption that each cluster likely has a different content feature instance. Various methods can be used to select a key frame from each of the separate content clusters, as will be described in greater detail below.

For example, in some embodiments, in response to determining that the multiple key frames including a particular content feature occur in separate clusters of key frames, the media system 108 can compare the confidence values of each key frame within each of the separate clusters of key frames. If one key frame has a higher confidence value than the remainder of the key frames within a particular cluster of key frames, the media system 108 selects the key frame having the highest confidence value to use in generating a potential a preview image of the media object. Accordingly, the media system 108 can select a highest rated key frame from each of the separate clusters of key frames (e.g., two separate clusters of key frames produces two selected key frames).

As discussed briefly above, if the media system 108 determines that multiple key frames of the separate clusters of key frames have the same highest confidence value, the media system 108 can select a single key frame of the multiple key frames have the same highest confidence value to include in a preview image of the media object in any of the methods described above in regard to step 220 of FIG. 2A. In additional embodiments, the media system 108 can identify the key frame of each cluster of key frames having the highest confidence value in any of the methods described above, and then, can compare a number of content features included in each of the highest confidence key frames in order to select at least one key frame to generate a potential preview image of the media object.

For example, after determining the highest confidence key frames of the separate clusters of key frames, the media system 108 can query the data table 400 of the media object database to compare the number of content features included in each of the highest confidence key frames of the separate clusters of key frames. By comparing the number of content features included in each of the highest confidence key frames of the separate clusters of key frames, the media system 108 can select a key frame from the highest confidence key frames having the highest number of content features included therein to include in a preview image of the media object. If two or more of the highest confidence key frames include a same highest number of content features, the media system 108 can select one of the highest confidence key frames according to any of the methods described above in regard to step 220 or FIG. 2A.

Referring again to steps 212-222 of FIG. 2A together, in selecting at least one key frame to use to generate a potential preview image of the media object for each identified content feature of a media object, the media system 108 can select one or more key frames that include multiple content features of the media object. In other words, the media system 108 can select a single key frame to use to generate a preview image for the media object that correspond to two or more content features. For example, the single selected key frame can include two or more content features, and for each of the two or more content features, the media system 108 selects the single key frame to include in a preview image of the media object.

In addition to selecting key frames to use in the generation of potential preview images of the media object, the media system 108 discards non-selected key frames, as shown in step 224 of FIG. 2A. For example, the media system 108 discards key frames that the media system 108 did not select to use as potential preview images for the media object. As used herein, the term "discard" and any derivative terms refers to the media system 108 removing an identification of the non-selected key frames as key frames. For example, the media system 108 can remove the non-selected key frames from the data tables 300 and 400 of the media object database discussed above in regard to FIGS. 3 and 4. In other embodiments, the term "discard" and any derivative terms can refer to the media system 108 marking the non-selected key frames as unusable as preview images of the media object. For example, the media system 108 may identify (e.g., mark) the non-selected key frames within the data tables 300 and 400 as unusable as preview images. In yet further embodiments, the term "discard" and any derivative terms, can refer to the media system 108 removing (e.g., deleting) the non-selected key frames from the data package of key frames discussed above in regard to step 206 of FIG. 2A.

Upon selecting one or more key frames for use to generate a potential preview image related to a particular content feature, in one or more embodiments the media system 108 generates tags to assign to each selected key frame, as shown in step 226 of FIG. 2B. As used herein, the term "tag" or any derivative terms refer to associating identifying data to a media object and/or a portion of a media object. For example, a tag can indicate content features associated with selected key frames from a media object.

As noted briefly above, the media system 108 generates tags to assign to the selected key frames of a media object that indicate the detected content features of the selected key frames. Each tag can indicate a content feature of the selected key frame to which the tag is associated. In other words, each tag can include data (e.g., text) that indicates one or more content features of the associated key frame. As a non-limiting example, a tag may include the text "dog" to indicate that the selected key frame to which the tag is assigned depicts a dog. As a result of the foregoing, depending on the content feature(s) depicted in a selected key frame, the media system 108 can associate a single tag to a selected key frame, or alternatively, the media system 108 can associate multiple tags to a selected key frame.

To generate and/or assign the tags to the selected key frames, the media system 108 can query the first data table and/or second data table of the media object database to determine the identified content features for each selected key frame. Upon determining the identified content feature(s) for each selected key frame, the media system 108 generates and associates the tags indicating the content features of the selected key frames. For example, the media system 108 may store data representing each tag in the media object database and may correlate each tag to its respective key frame within the media object database (e.g., within the data tables 300 or 400).

In addition to generating tags, the media system 108 generates potential preview images for the media object based on each of the selected key frames, as shown in step 228 of FIG. 2A. Specifically, the media system 108 generates the potential preview images of the media object to include an image of each of the key frames. In some embodiments, the media system 108 generates a potential preview image to include the entire image within a particular selected key frame (e.g., the preview image is the image the selected key frame image). In other embodiments, the media system 108 generates a potential preview image to include only a portion of the image of a selected key frame (e.g., a portion of the image that includes the content feature). Furthermore, the media system 108 may store data representing each of the generated potential preview images within the media object database.

Referring still to FIG. 2B, the media system 108 may correlate data representing the selected key frames, assigned tags, and potential preview images of the media object with the media object itself, as shown in step 230. Specifically, the media system 108 can correlate metadata with the media object, and the metadata may represent (e.g., indicate and/or include) the selected key frames, assigned tags, and potential preview images. For example, the media system 108 can store the metadata and can correlate the metadata with the media object within the media object database of the media-hosting server device 104.

As discussed briefly above, the media system 108 generates the potential preview images of the media object in order to be able to provide relevant preview images of the media object in response to a search query. FIG. 2C illustrates a sequence flow diagram 250 of providing relevant preview images of video content of a media object in response to a search query. For example, FIG. 2C illustrates that the media system 108 can receive a search query from a client device 102, as shown in step 252. For example, the media system 108 can receive a search query from the search engine 112 of the client device 102. The search query can include one or more search terms that a user provides in an effort to locate video content of interest to the user.

In response to receiving a search query from a client device 102, the media system 108 can query to media object database of the media system 108 and, specifically, the tags of the selected key frames of the media objects stored in the media object database, as shown in step 254 of FIG. 2B. Based on the query, the media system 108 can identify a media object as a search result to the search query, as illustrated by step 255 shown in FIG. 2C. For example, the media system 108 can querying tags associated with media objects to identify a media object to provide as a search result in response to the search query.

Although the media system 108 is described herein as querying the media object database while searching for the search terms of the search query within the tags of the media objects, the disclosure is not so limited. For example, when searching for tags of the media objects matching the search terms of the search query, the media system 108 can search for derivative terms of the search terms, synonyms of the search terms, and/or related terms of the search terms. As a result, the media system 108 may identify media objects, as well as preview images of media objects even if a user 110 does not use the exact language of the tags of the media objects in the user's 110 search query.

In addition to identifying media objects to provide as search results, the media system 108 can select at least one preview image to provide to the client device 102 as a representation of an identified media object, as shown in step 256 of FIG. 2C. For example, based on identifying a particular media object, the media system 108 can determine which potential preview image from the one or more potential preview images associated with the media object is most relevant to the search query. In particular, based on the tags associated with the selected key frames and/or the corresponding potential preview images, the media system 108 can select a preview image that includes content features that relate to the search query.

In some embodiments, selecting a preview image to provide to the client device 102, the media system 108 can select a first preview image of a media object that includes all of the content features correlating to the search terms of the search query. If, on the other hand, none of the preview images of the media object include all of the content features correlating to the search terms of the search query, the media system 108 can select a preview image of a media object that includes a highest number of content features correlating to the search terms of the search query. In other words, the media system 108 selects a preview image of the media object that depicts the most content features that relate the most search terms of the search query.

For example, if the search query includes four search terms and a first preview image includes two content features that relate to the two of the four search terms, while a second preview image includes three content features that relate to three of the four search terms of the search query, the media system 108 selects the second preview image to provide to the client device 102 in response to the search query. As a result, the media system 108 provides the most relevant preview images (e.g., video scenes) within video content as a search result to a user generated search query.

In one or more additional embodiments, the media system 108 can select two or more preview images associated with a single media object to provide to the client device 102 in response to the search query. For example, the media system 108 can select a first preview image and a second preview image of the media object based on both the first and second preview images sufficient relating to the search query (e.g., meeting a relatedness threshold to one or more search terms in the search query). In other words, in some embodiments, the media object may include multiple preview images that relate to a search query based on the content features depicted within the search query. As a non-limiting example, a first preview image of the media object may relate a first search term (e.g., dog) of a search query and a second preview image of the media object may relate to a second search term (e.g., cat) of the search query. In such an instance, the media system 108 can select both the first and second preview images to provide to the client device in response to the search query. For example, the media system 108 can provide the first preview image and the second preview image as to separate results, with each preview image linking to a corresponding key frame of the same media object.

In addition to selecting one or more preview images of the single media object to provide to the client device, the media system 108 can optionally generate a combination preview image to provide to the client device, as shown in step 258 of FIG. 2B. Specifically, when the media system 108 selects two or more preview images of a single media object to provide to the client device, the media system 108 can combine the two or more preview images to form a combination preview image. For example, in some instances, the media system 108 can generate a collage of the two or more preview images of the single media object. In such embodiments, the media system 108 generates a combination preview image to assure that as many of the content features that relate to the search query are shown in the combination preview image as possible. As a result, a user (e.g., the user 110), via a client device (e.g., client device 102), can more readily recognize media objects having multiple content features that may interest the user based on the user's search query.

In one or more embodiments, a combination preview image can include a thumbnail "slideshow" arrangement where a selected preview image is displayed for a period of time and then is replaced by a next selected preview image. In addition, another example combination preview image can present the most relevant preview image along with a graphical element indicating one or more additional preview images. A user can interact with the graphical element (e.g., by clicking on the graphical element or providing a touch gesture to the graphical element) to access the one or more additional preview images for the particular media object that relate to the user provided search query.

Once a preview image of a relevant media object has been selected and/or generated, the media system 108 can provide the preview image to the client device for presentation to the user, as shown in step 260 of FIG. 2C. For example, the media system 108 can provide the preview image of the media object within a results page such that the search engine causes the client device to present the preview image to the user 110 via a display of the client device 102. Furthermore, the preview image may include a hyperlink to the media object such that by selecting the preview image, the client device 102 requests and downloads a copy of the media object to the client device 102 for presentation to the user 110.

Although the media-hosting device is described above as performing steps 204-230, in some additional embodiments, the media hosting device can provide the media object to a third party server, and the third party server can perform steps 204-230. Furthermore, in some embodiments, the third party server can provide a preview image to a client device in response to a search query.

Figure 5:
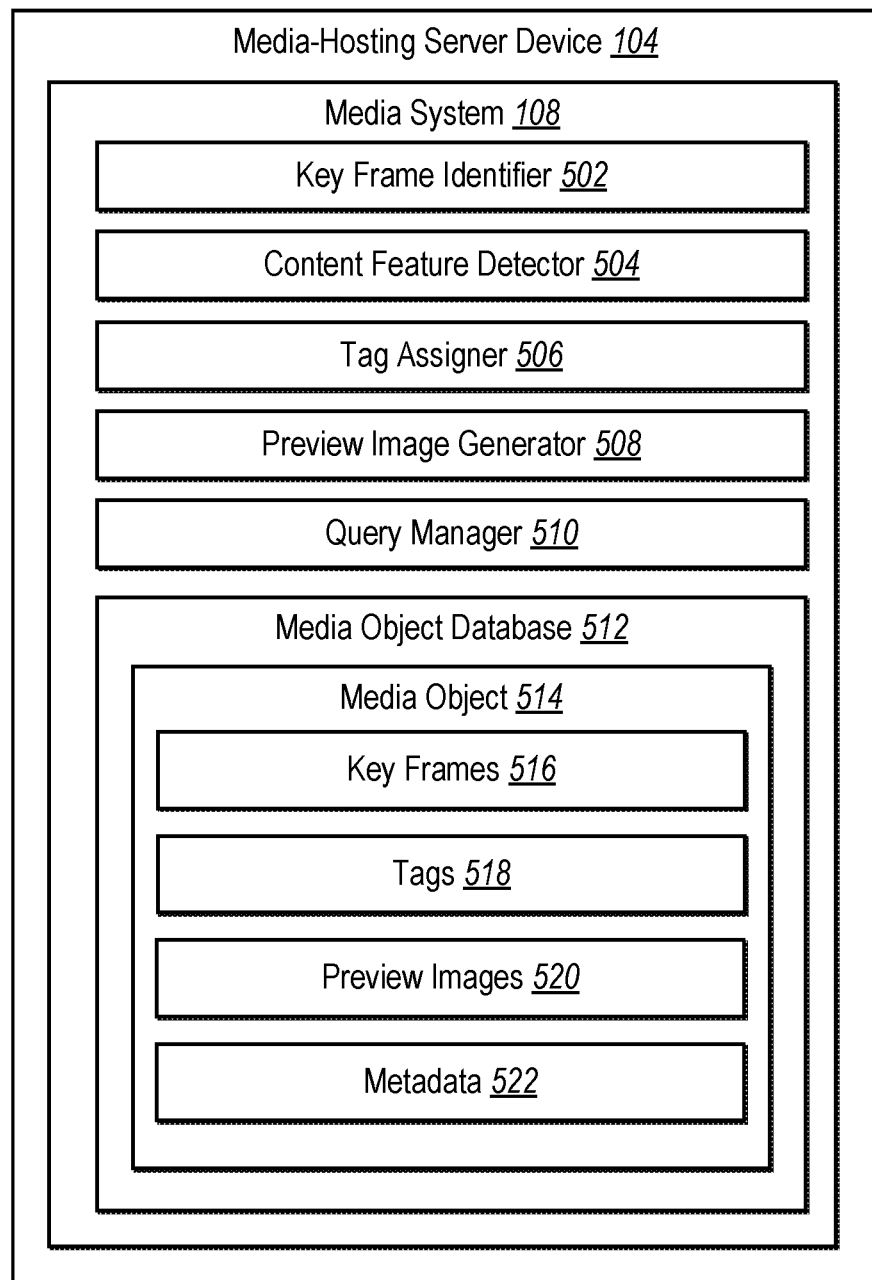
FIG. 5 shows a schematic representation of a media system according to one or more embodiments.

FIG. 5 illustrates a schematic diagram of media-hosting server device 104 having a media system 108 in accordance with one or more embodiments. The media system 108 may be an example embodiment of the media system 108 described in connection with the media system 108 referenced in FIGS. 1-4. The media system 108 can include various components for performing the processes and features described herein. For example, and as illustrated in FIG. 5, the media system 108 includes a key frame identifier 502, a content feature detector 504, a tag assigner 506, a preview image generator 508, a query manager 510, and a media object database 512. In addition, the media system 108 may include additional components not illustrated, such as those as described below. The various components of the media system 108 may be in communication with each other using any suitable communication protocols.

Each component of the media system 108 may be implemented using one or more computing devices (e.g., media-hosting server devices 104) including at least one processor executing instructions that cause the media system 108 to perform the processes described herein. The components of the media system 108 can be implemented by a single media-hosting server device 104 or across multiple media-hosting server devices 104, as described above. Although a particular number of components are shown in FIG. 5, the media system 108 can include more components or can combine the components into fewer components (such as a single component), as may be desirable for a particular implementation.

As briefly mentioned above, the media system 108 includes a key frame identifier 502. The key frame identifier 502 can manage the identification of the key frames of the media objects, as described above in regard to step 206 of FIG. 2A. In particular, the key frame identifier can utilize non-content-based and content-based methods for identifying key frames of a media object. Furthermore, the key frame identifier can manage selecting key frames for the purpose of generating potential preview images for a media item, as described above in regard to step 212 of FIG. 2A.

As discussed above, the media system 108 further includes a content feature detector 504. The content feature detector 504 may manage the detection of content features within the key frames identified by the key frame identifier 502. Specifically, the content feature detector 504 can use content feature recognition technology, e.g., machine learning, to detect the content features within the key frames. In some example embodiments, upon detecting content features, the content feature detector 504 can store data representing the detected content features. For example, the content feature detector 504 can detect content features of the media object and store data related to the content features in any of the manners discussed above in regard to step 208 of FIG. 2A.

As mentioned above, the media system 108 includes a tag assigner 506. The tag assigner 506 can generate and assign tags to selected key frames. In particular, the tag assigner 506 can generate and assign tags to key frames that indicate the content features of key frames, as detected by the content feature detector 504. In some example embodiments, the tag assigner 506 can store data representing the tags in the media object database 512 and can correlate the tags to their respective key frames of the media object. Furthermore, the tag assigner 506 can assign tags to selected key frames in any of the methods described above in regard to step 226 of FIG. 2A.

As briefly mentioned above, the media system 108 includes a preview image generator 508. The preview image generator 508 can manage the generation of preview images of the media object based on selected key frames. For example, once the key frame identifier 502 has selected a key frame to use as a basis for a potential preview image for a media object, as described above in regard to step 212 of FIG. 2A, the preview image generator 508 can generate a preview image including the selected key frame image. Furthermore, as noted above, the preview image generator 508 can combine two or more images from two or more selected key frames to include within a preview image of the media object (e.g., the preview image generator 508 can combine two or more selected key frames into a collage to include in the preview image). The preview image generator 508 can generate preview images in any of the methods described above in regard to step 226 of FIG. 2B or step 258 of FIG. 2C.

Additionally, as discussed above, the media system 108 can further include a query manager 510. The query manager 510 can manage receiving search queries from, for example, the client device 102 and querying the media object database 512 of the media system 108 to identify media objects relevant to the search queries. For example, after receiving a search query having search terms, the query manager 510 can query the media object database 512 to compare the search terms of the search query to the tags of selected frames of media object. Upon finding a match, the query manager 510 can provide the correlated selected key frame(s) to the preview image generator 508 in case a preview image needs to be generated. Otherwise, upon finding a match, the media system 108 can provide a correlated preview image to the client device as described above in regard to step 260 of FIG. 2C.

As mentioned above, the media system 108 includes a media object database 512. The media object database 512 may include a single database or multiple databases. In addition, the media object database 512 may be located within the media system 108. Alternatively, the media object database 512 may be external to the media system 108, such as in cloud or remote storage. Further, the media object database 512 may store and provide data and information to the media system 108, as further described below and as described above in regard to FIGS. 2A-4.

The media object database 512 may include media objects 514 provided to the media-hosting server device 104. Each media object 514 can have a media object identifier number (or simply "media object ID number") to provide unique identification. In some cases, the media objects 514 may be organized according to media object ID number. Alternatively, media objects 514 in the media object database 512 may be organized according to other criteria, such as creation date, timestamps, last modified date, most recent results, etc.

As shown in FIG. 5, the media object 514 of the media object database 512 can include key frames 516, tags 518, preview images 520, and metadata 522. The media system 108 may store the key frames 516 grouped according to a respective media object 514. Further, each key frame 516 may have a unique question identifier number (or simply "key frame ID number"). In some cases, the key frame ID number can also identify the media object 514 to which the key frame 516 belongs. For example, all key frames 516 from a particular media object 514 may include the media object ID number within the key frame ID number.

Further, each tag 518 of the media object 512 may be associated with a key frame 514 of the media object 512. When the media system 108 detects a content feature of a key frame 516 and assigns a tag 518 to the key frame 516, as discussed above in regard to FIG. 2A, the media system 108 can add the tag 518 as part of the tags 518. As such, the tags 518 can include a cumulative set of tags 518 for a media object 514. Further, each tag 518 can have a unique tag identifier (or simply "tag ID"). In some instances, the tag ID may identify the media object 514 and/or the selected key frame 516 to which the tag 518 correlates. For instance, based on the tag ID, the media system 108 is able to identify the corresponding media object 514 and/or the selected key frame 516 of the media object 514.

As noted above, the media object 514 of the media object database 512 can be associated with one or more potential preview images 520. Further, each preview image 520 for the media object 514 may be associated with at least one selected key frame 516 and associated tags 518 of the media object 514. When the media system 108 generates a preview image 520 based on the detected content features of the media item 514 and selected key frames 516, as discussed above in regard to FIG. 2A, the media system 108 can add the preview image 520 as part of the potential preview images 520. As such, the preview images 520 can include a cumulative set of preview images 520 for a given media object 514. Further, each preview image 520 can have a unique tag identifier (or simply "preview image ID"). In some instances, the preview image ID may identify the media object 514 and/or the selected key frame 516 to which the preview image ID correlates. For instance, based on the preview image ID, the media system 108 is able to identify the corresponding media object 514 and/or the selected key frame 516 of the media object 514.

As mentioned briefly above, the media object 514 can further include metadata 522 associated with the media object 514. For example, the media object can include metadata 522 such as the metadata 522 described above in regard to FIG. 2B. Specifically, the metadata may associate the key frames 516, tags 518, and preview images 520 with the media object 514.

Figure 6:
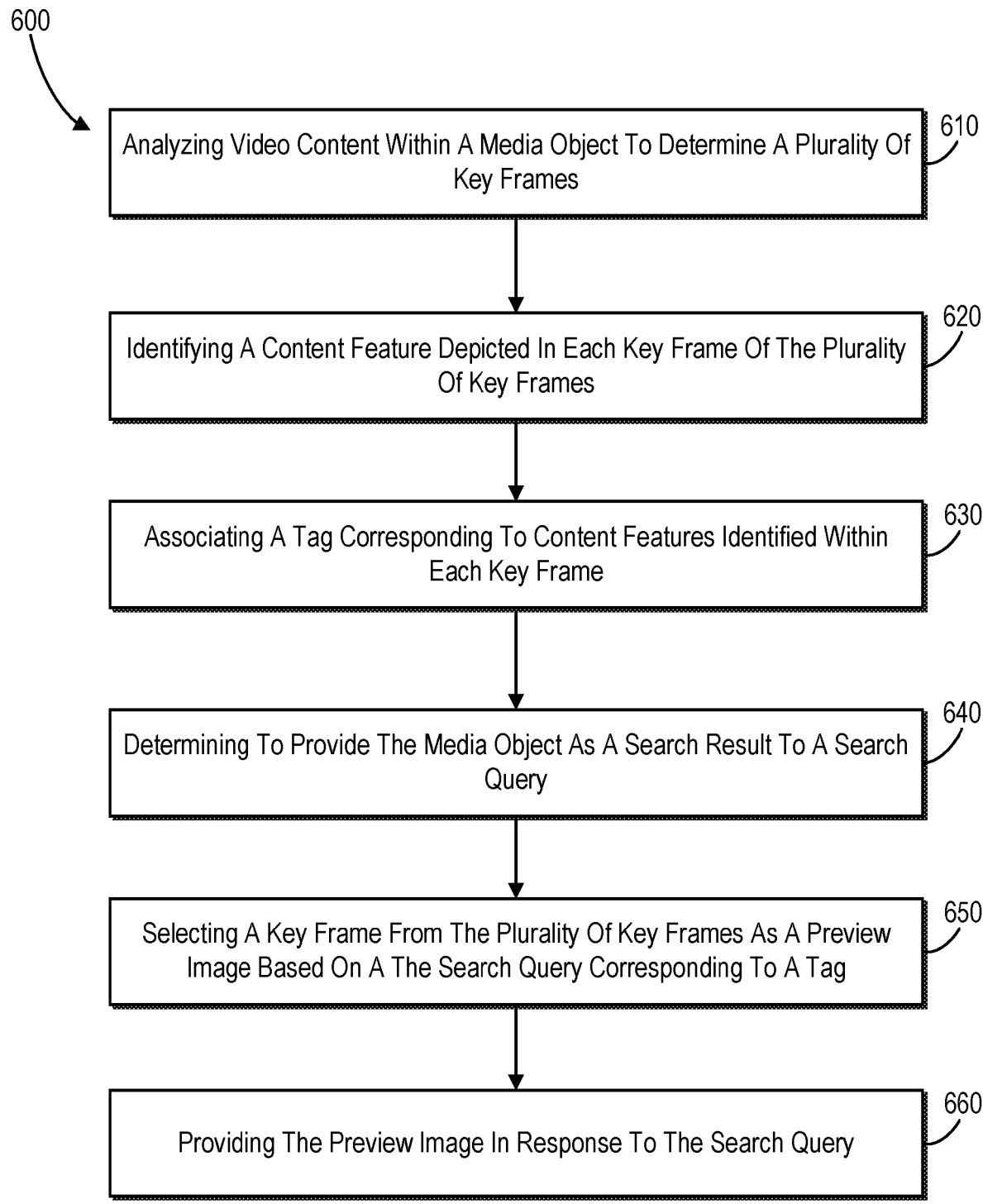
FIG. 6 shows a flowchart of an example method for providing a relevant preview images of a video in response to a search query in accordance with one or more embodiments.

FIG. 6 illustrates a flowchart of an example method 600 for providing relevant video scenes (e.g., preview images) in response to a video search query. The method 600 can be implemented by the media system 108 described above. The method 600 involves an act 610 of analyzing video content within a media object 514 to determine a plurality of key frames. For example, act 610 can include analyzing, by at least one processor, a media object comprising a plurality of frames of video content to determine a plurality of key frames within the video content.

Additionally, the method 600 involves an act 620 of identifying a content feature depicted in each key frame of the plurality of key frames. Act 620, for example, can include identifying, by the at least one processor, a content feature depicted in each key frame of the plurality of key frames. For example, the media system 108 can utilize machine-learning and/or deep learning to detect and identify one or more content features within each key frame. In particular, the act 620 may include detecting objects, activities (e.g., running, skydiving, hiking), photo types (e.g., macro, portrait, etc.), emotions (e.g., smiling, crying, etc.), animals, sceneries (e.g., beach, forest, mountains), locations, colors, etc. depicted in the key frames 516 of the media object 514. Moreover, the act 620 may include detecting content features depicted in key frames 516 using machine learning. Additionally, the act 630 may include any of the actions described above in regard to step 208 of FIG. 2A.

Furthermore, the method 600 involves an act 630 of associating a tag corresponding to content features identified within each key frame. For example, act 630 can include associating, by the at least one processor, a tag with each key frame of the plurality of key frames, wherein a given tag corresponds to a given content feature depicted in a given key frame of the plurality of key frames. For example, the act 630 may include associating one or more tags 518 with the one or more key frames 516 of the plurality of key frames 516 of the media object 514 within the media object database 512 (e.g., within the first or second data tables of the media object database 512). Additionally, the act 630 may include any of the actions described above in regard to step 226 of FIG. 2B.

The method 600 also involves an act 640 of determining to provide the media object as a search result to a search query. For instance, act 640 can include determining to provide the media object as a search result to a search query received from a client device. For example, a client device associated with a user can send the media system 108 a search query including one or more search terms, and the media system 108 determines one or more media objects to provide within a search results list.

Moreover, method 600 can further include an act 650 of selecting a key frame from the plurality of key frames as a preview image based on the search query corresponding to a tag. For example, the act 650 can include selecting a key frame from the plurality of key frames as a preview image for the media object based on the search query relating to a particular content feature depicted in the selected key frame as indicated by a particular tag associated with the selected key frame.

Furthermore, the method 600 involves an act 660 of providing the preview image in response to the search query. For instance, act 660 can include providing, to the client device, the preview image for the media object in response to the search query. Additionally, method 600 can include selecting at least one key frame 516 of the plurality of key frames 516 of the media object 514 based on a confidence value associated with each detected content feature of each key frame 516 of the plurality of key frames 516 (e.g., selecting at least one key frame 516 of the plurality of key frames 516 having a highest confidence value for each detected content feature to include in a preview image 520 of the media item). Moreover, method 600 can also include discarding non-selected key frames 516 of the plurality of key frames 516 of the media object 514. Furthermore, method 600 can include generating a plurality of preview image of the media object 514. Additionally, the method 600 can include any of the actions described above in regard to FIGS. 2A-4.

Figure 7:
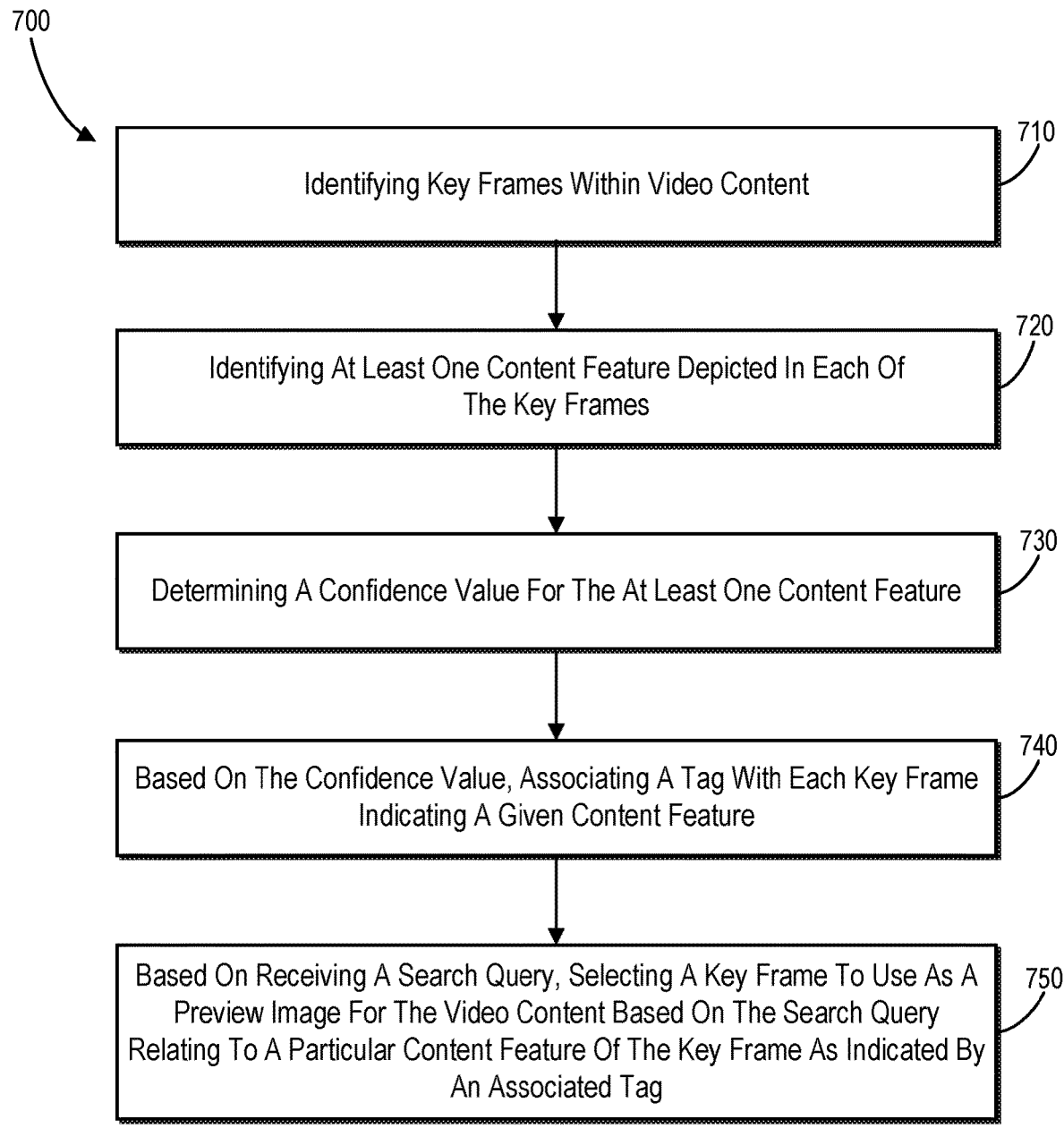
FIG. 7 shows a flowchart of another example method for providing a relevant preview images of a video in response to a search query in accordance with one or more embodiments.

FIG. 7 illustrates a flowchart of another example method 700 for providing relevant video scenes (e.g., preview images 520) in response to a video search query. The method 700 can be implemented by the media system 108 described above. The method 700 involves an act 710 identifying key frames within video content. For example, act 710 can include identifying, by at least one processor of a media hosting server device, key frames from a plurality of frames within video content maintained on the media hosting server device. Furthermore, act 710 can include utilizing content-based and non-content-based methods of identifying key frames 516 of the media object 514.

The method 700 may further include an act 720 of identifying at least one content feature depicted in each of the key frames. Specifically, act 720 can include identifying, by the at least one processor, at least one content feature depicted in each of the key frames. For instance, act 720 can further include detecting objects, activities (e.g., running, skydiving, hiking), photo types (e.g., macro, portrait, etc.), emotions (e.g., smiling, crying, etc.), animals, sceneries (e.g., beach, forest, mountains), locations, colors, etc. depicted in the key frames 516 of the media object 514. Furthermore, the act 720 may include detecting content features depicted in key frames 516 using machine learning.

Additionally, the method 700 includes an act 730 of determining a confidence value for the at least one content feature. In particular, the act 730 may include determining, by the at least one processor, a confidence value for the at least one content feature depicted in each of the key frames. For example, the act 760 can include assigning a confidence value to each detected content feature of the one or more content features as determined by content feature recognition technology, such as, for example, machine learning as described above.

The method 700 also involves an act 740 of, based on the confidence value, associating a tag with each key frame indicating a given content feature. For example, the act 780 may include associating tags with the key frames based on the confidence values for the at least one content feature depicted in each of the key frames, a given tag indicating a given content feature depicted in a given key frame. For example, act 740 can include associating one or more tags 518 with the one or more of the key frames 516 of the media object 514 within the media object database 512 (e.g., within the first or second data tables 300, 400 of the media object database 512).

Furthermore, the method 700 involves an act 750 of based on receiving a search query, selecting a key frame to use as a preview image for the video content based on the search query relating to a particular content feature of the key frame as indicated by an associated tag. For instance, act 750 can include based on receiving a search query, selecting a key frame to use as a preview image for the video content by determining that the search query is related to a particular content feature depicted in the selected key frame as indicated by a particular tag associated with the selected key frame.

In addition to the steps illustrated, method 700 can also include storing data in a media object database 512 associating the one or more tags 518 with the key frames 516 of the media object 514. Additionally, method 700 can also include determining frame specifications comprises determining a frame rate and number of frames of the media object 514. Furthermore, method 700 can include for each detected content feature, selecting at least one key frame 516 of the media object 514 to include in a preview image 520 of the media object 514. Additionally, the method 700 can include any of the actions described above in regard to FIGS. 2A and 2B.

Figure 8:
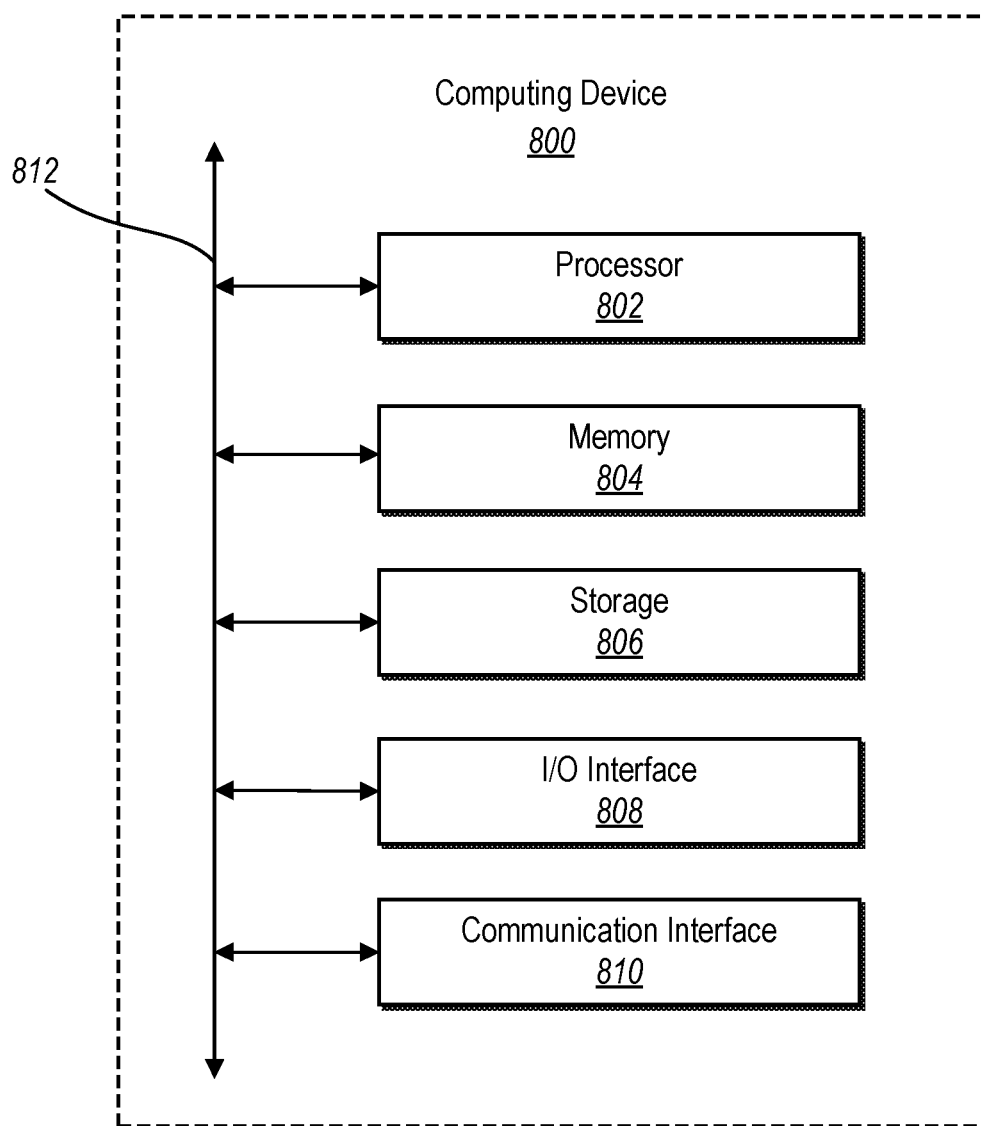
FIG. 8 illustrates a block diagram of an example computing device in accordance with one or more embodiments.

FIG. 8 illustrates a block diagram of an example computing device 800 that may be configured to perform one or more of the processes described above. One will appreciate that one or more computing devices such as the computing device 800 may implement the media system 108 and/or client device 102. As shown by FIG. 8, the computing device 800 can comprise a processor 802, a memory 804, a storage device 806, an I/O interface 808, and a communication interface 810, which may be communicatively coupled by way of a communication infrastructure 812. While an example computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation look aside buffers (TLBs). Instructions in the instruction caches may be copies of instructions in the memory 804 or the storage 806.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 includes a storage device 806 that includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 800 also includes one or more input or output ("I/O") devices/interfaces 808, which are provided to allow a user to provide input to, receive output from, and otherwise transfer data to and receive data from computing device 800. The I/O devices/interfaces 808 may include a mouse, a keypad or a keyboard, a touch screen, a camera, an optical scanner, network 108 interface, modem, other known I/O devices or a combination of such I/O device/interfaces. The touch screen may be activated with a stylus or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this invention. Indeed, various modifications of the present disclosure, in addition to those shown and described herein, such as alternative useful combinations of the content features described, may become apparent to those skilled in the art from the description. Such modifications and embodiments are also intended to fall within the scope of the appended claims and legal equivalents.

We claim:

1. A method of providing relevant cover frames in response to video search queries, the method comprising:
   receiving a search query comprising one or more search terms;
   identifying a set of digital videos that are responsive to the search query;
   determining, for each digital video from the set of digital videos, a video frame from the digital video for use in a preview image for the digital video by comparing the one or more search terms to tags associated with video frames of the digital video, the determined video frame depicting content features corresponding to the one or more search terms; and
   providing in response to the search query, the preview image for each digital video from the set of digital videos, wherein each preview image comprises the determined video frame, for a corresponding digital video from the set of digital videos, that depicts the content features corresponding to the one or more search terms.

2. The method of claim 1, wherein:
   receiving the search query comprises receiving two or more search terms;
   determining the video frame comprises determining a video frame that has an associated tag corresponding to each of the two or more search terms; and
   providing in response to the search query, the preview image comprises providing the video frame that has an associated tag corresponding to each of the two or more search terms and depicts content features corresponding to each of the two or more search terms.

3. The method of claim 1, wherein:
   determining, for each digital video from the set of digital videos, the video frame from the digital video for use in the preview image for the digital video comprises identifying a first video frame, from a first digital video, that depicts the content features corresponding to the one or more search terms; and
   providing in response to the search query, the preview image for each digital video from the set of digital videos comprises providing the first video frame that depicts the content features corresponding to the one or more search terms.

4. The method of claim 3, further comprising:
   receiving a second search query comprising one or more different search terms;

identifying a second video frame, from the first digital video, that depicts content features corresponding to the one or more different search terms; and providing in response to the second search query, the second video frame as a preview image for the first digital video.

5. The method of claim 1, wherein determining, for each digital video from the set of digital videos, the video frame from the digital video for use in the preview image for the digital video comprises, for a first digital video:

determining a first key frame that has associated tags corresponding to each of the one or more search terms;

determining a second key frame that has associated tags corresponding to each of the one or more search terms;

comparing one or more first confidence values for the first key frame with one or more second confidence values of the second key frame; and based on comparing the one or more first confidence values and the one or more second confidence values,. selecting the first key frame as the preview image for the first digital video.

6. The method of claim 1, wherein identifying the set of digital videos that are responsive to the search query comprises identifying a plurality of digital videos with associated tags that correspond with at least one of the one or more search terms.

7. The method of claim 6, wherein identifying the plurality of digital videos with the associated tags that correspond with at least one of the one or more search terms comprises identifying a digital video with an associated tag that matches a search term, that is a derivative of the search term, that is a synonym of the search term, or is related to the search term.

8. The method of claim 1, wherein providing in response to the search query, the preview image for each digital video from the set of digital videos comprises providing a plurality of preview images.

9. The method of claim 8, further comprising:

receiving a selection of a first preview image that depicts the content features corresponding to the one or more search terms; and providing, in response to the selection, access to a first digital video from which the first preview image was obtained.

10. A non-transitory computer readable medium storing instructions thereon that, when executed by at least one processor, cause a computer system to:

identify content features depicted in video frames of digital videos;

associate tags with the video frames of the digital videos that indicate the identified content features depicted in the video frames;

receive a search query comprising one or more search terms;

identify a set of digital videos that are responsive to the search query;

determine, for each digital video from the set of digital videos, a video frame from the digital video for use in a preview image for the digital video by comparing the one or more search terms to one or more tags associated with one or more video frames of the digital video, the determined video frame depicting content features corresponding to the one or more search terms; and provide in response to the search query, the preview image for each digital video from the set of digital videos, wherein each preview image for a given digital video comprises the determined video frame for the given digital video that depicts the content features corresponding to the one or more search terms.

11. The non-transitory computer readable medium of claim 10, wherein the instructions, when executed by the at least one processor, cause the computer system to identify the content features depicted in the video frames of the digital videos by identifying objects, activities, or colors within key frames of the digital videos.

12. The non-transitory computer readable medium of claim 10, further comprising instructions, that when executed by the at least one processor, cause the computer system to:

group video frames sharing content features into clusters; and select a representative video frame from a cluster of video frames as a key frame.

13. The non-transitory computer readable medium of claim 10, wherein the instructions, when executed by the at least one processor, cause the computer system to identify the content features depicted in the video frames of the digital videos utilizing a convolutional neural network.

14. The non-transitory computer readable medium of claim 13, further comprising instructions, when executed by the at least one processor, cause the computer system to:

determine a confidence value that a content feature is depicted within a video frame; and associate a tag with the video frame that indicates the content feature is depicted within the video frame based on the confidence value being above a threshold.

15. The non-transitory computer readable medium of claim 10, wherein the instructions, when executed by the at least one processor, cause the computer system to:

receive the search query by receiving two or more search terms;

determine the video frame depicts the content features corresponding to the one or more search terms by determining that the video frame has an associated tag corresponding to each of the two or more search terms; and provide in response to the search query, the preview image by providing the video frame that has an associated tag corresponding to each of the two or more search terms and depicts content features corresponding to each of the two or more search terms.

16. A system comprising:

a digital memory storage device comprising a database of digital videos; and at least one server configured to cause the system to:

receive, from a client device, a search query comprising two or more search terms;

identify a set of digital videos from the database of digital videos that are responsive to the search query by identifying digital videos having associated tags that correspond to at least one of the two or more search terms;

determine, for each digital video from the set of digital videos, a video frame from the digital video for use in a preview image for the digital video by comparing the two or more search terms to tags associated with video frames of the digital video, the determined video frame depicting content features corresponding to the two or more search terms; and send, to the client device in response to the search query, the preview image for each digital video from the set of digital videos, wherein each preview image comprises a respective video frame for a corresponding digital video from the set of digital videos that depicts the content features corresponding to the two or more search terms.

17. The system of claim 16, wherein the at least one server is further configured to cause the system to determine, for each digital video from the set of digital videos, the video frame from the digital video for use in the preview image for the digital video by identifying a key frame that has highest confidence values for tags corresponding to the two or more search terms.

18. The system of claim 16, wherein the at least one server is further configured to cause the system to attach a hyperlink to each preview image pointing to a respective digital video corresponding to the preview image.

19. The system of claim 16, wherein the at least one server is further configured to cause the system to select the preview image for a given digital video by:
determining that a first video frame and a second video frame depict content features corresponding to each of the two or more search terms;
comparing a first confidence value for the first video frame with a second confidence value of the second video frame; and
based on determining that the first confidence value exceeds the second confidence value, selecting the first video frame as the preview image for the given digital video.

20. The system of claim 16, wherein the at least one server is further configured to cause the system to:
analyze the digital videos from the database of digital videos that are responsive to the search query to determine a plurality of key frames for each digital video; and
determine, for each digital video from the set of digital videos, the video frame that depicts content features corresponding to each of the two or more search terms by comparing the two or more search terms to tags associated with the plurality of key frames for each digital video.

* * * * *